US012801349B2

(12) United States Patent
Suzuki et al.

(10) Patent No.: US 12,801,349 B2
(45) Date of Patent: Nov. 17, 2026

(54) INFORMATION PROCESSING DEVICE, SYSTEM, METHOD, AND STORAGE MEDIUM FOR SOLVING COMBINATORIAL OPTIMIZATION PROBLEM

(71) Applicants: KABUSHIKI KAISHA TOSHIBA, Tokyo (JP); TOSHIBA DIGITAL SOLUTIONS CORPORATION, Kawasaki (JP)

(72) Inventors: Masaru Suzuki, Tokyo (JP); Hayato Goto, Kawasaki (JP); Kosuke Tatsumura, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 845 days.

(21) Appl. No.: 17/487,179

(22) Filed: Sep. 28, 2021

(65) Prior Publication Data

US 2022/0012017 A1 Jan. 13, 2022

Related U.S. Application Data

(63) Continuation of application No. PCT/JP2020/014190, filed on Mar. 27, 2020.

(30) Foreign Application Priority Data

Mar. 28, 2019 (JP) ................................ 2019-064699

(51) Int. Cl.
*G06F 17/16* (2006.01)
*G06F 7/57* (2006.01)

(52) U.S. Cl.
CPC ................ *G06F 7/57* (2013.01); *G06F 17/16* (2013.01)

(58) Field of Classification Search
CPC . G06F 30/20; G06F 7/57; G06F 17/16; G06F 7/4925; G06F 7/582; G06F 2111/10; G06N 10/60; G06N 10/00
See application file for complete search history.

(56) References Cited

U.S. PATENT DOCUMENTS 10,832,013 B2 11/2020 Ishida
2008/0065573 A1* 3/2008 Macready ............... G06N 7/08 706/19

(Continued)

FOREIGN PATENT DOCUMENTS

CN 104091038 A 10/2014
CN 107347073 A 11/2017

(Continued)

OTHER PUBLICATIONS

Bian, Zhengbing, et al. "The Ising model: teaching an old problem new tricks." D-wave systems 2 (2010): 1-32 (Year: 2010).*

(Continued)

*Primary Examiner* — David A Hopkins
(74) *Attorney, Agent, or Firm* — Finnegan, Henderson, Farabow, Garrett & Dunner, LLP

(57) ABSTRACT

An information processing device includes arithmetic circuits each configured to repeatedly update a first vector which has a first variable as an element and a second vector which has a second variable corresponding to the first variable as an element, and a data exchange circuit. Each arithmetic circuit is configured to update the first variable based on the corresponding second variable, weight the first variable with a first coefficient and add the weighted first variable to the corresponding second variable, calculate a problem term using a plurality of the first variables, and add the problem term to the second variable; different values are set as the first coefficients in the respective arithmetic circuits. The data exchange circuit is configured to execute (Continued)

at least one of exchange of the first vector and the second vector or exchange of the first coefficients between the arithmetic circuits.

19 Claims, 16 Drawing Sheets

(56) References Cited

U.S. PATENT DOCUMENTS

| | | | | |
|---|---|---|---|---|
| 2019/0087388 | A1* | 3/2019 | Venturelli | G06N 10/00 |
| 2019/0266213 | A1* | 8/2019 | Hastings | G06F 17/17 |
| 2020/0401650 | A1* | 12/2020 | Chen | G06N 5/02 |
| 2021/0150400 | A1* | 5/2021 | Pistoia | G06N 10/00 |
| 2022/0012017 | A1* | 1/2022 | Suzuki | G06F 17/11 |
| 2022/0012306 | A1* | 1/2022 | Suzuki | G06N 7/01 |
| 2022/0012307 | A1* | 1/2022 | Suzuki | G06F 17/13 |
| 2022/0019715 | A1* | 1/2022 | Ito | G06N 7/01 |

FOREIGN PATENT DOCUMENTS

| | | | |
|---|---|---|---|
| CN | 108604312 | A | 9/2018 |
| CN | 108988872 | A | 12/2018 |
| WO | WO 2016/194051 | A1 | 12/2016 |

OTHER PUBLICATIONS

Chapuis, Guillaume, et al. "Finding maximum cliques on a quantum annealer." Proceedings of the Computing Frontiers Conference. 2017. (Year: 2017).*
Djidjev, Hristo N., et al. "Efficient combinatorial optimization using quantum annealing." arXiv preprint arXiv:1801.08653 (2018). (Year: 2018).*
Haribara, Yoshitaka. "Realization and Evaluation of Measurement Feedback Coherent Ising Machines for Combinatorial Optimization Problems." U. Tokyo dissertation (2017). (Year: 2017).*
Lawrence Livermore National Laboratory, "Introduction to Parallel Computing Tutorial", accessed on Jul. 19, 2024, URL: hpc(dot)llnl(dot)gov/documentation/tutorials/introduction-parallel-computing-tutorial (Year: 2024).*
Nvidia, "MPI Solutions for GPUs", accessed via WayBack Machine, archive Date Feb. 15, 2019, URL: developer(dot)nvidia(dot)com/mpi-solutions-gpus (Year: 2019).*
Parekh, Ojas, et al. "Benchmarking adiabatic quantum optimization for complex network analysis." arXiv preprint arXiv:1604.00319 (2016). (Year: 2016).*
Venturelli, Davide, et al. "Quantum optimization of fully connected spin glasses." Physical Review X 5.3 (2015): 031040 (Year: 2015).*
Vyskocil, Tomas, and Hristo Djidjev. "Simple constraint embedding for quantum annealers." 2018 IEEE International Conference on Rebooting Computing (ICRC). IEEE, 2018 (Year: 2018).*
Zahedinejad, Ehsan, and Arman Zaribafiyan. "Combinatorial optimization on gate model quantum computers: A survey." arXiv preprint arXiv:1708.05294 (2017). (Year: 2017).*
De Santis, Marianna, et al. "A nonmonotone grasp." Mathematical Programming Computation 8 (2016): 271-309. (Year: 2016).*
Vattulainen, Ilpo. "New tests of random numbers for simulations in physical systems." arXiv preprint cond-mat/9411062 (1994). (Year: 1994).*
Binder, K. (2017). Monte Carlo Simulations in Statistical Physics. In: Meyers, R. (eds) Encyclopedia of Complexity and Systems Science. Springer, Berlin, Heidelberg. Glossary: "Random number generator (RNG)" (Year: 2017).*
Goto, Hayato, Kosuke Tatsumura, and Alexander R. Dixon. "Combinatorial optimization by simulating adiabatic bifurcations in nonlinear Hamiltonian systems." Science advances 5.4 (2019): eaav2372. Abstract, pp. 1-4 (Year: 2019).*
Goto, Hayato. "Bifurcation-based adiabatic quantum computation with a nonlinear oscillator network." Scientific reports 6.1 (2016): 21686. Abstract, pp. 1-6 (Year: 2016).*
Bagnoli, Franco, and Raúl Rechtman. "Stochastic bifurcations in the nonlinear parallel Ising model." Physical Review E 94.5 (2016): 052111. Abstract, pp. 1-4 (Year: 2016).*
Ralphs, Ted, et al. "Parallel solvers for mixed integer linear optimization." Handbook of parallel constraint reasoning (2018): 283-336 (Year: 2018).*
Pabolu, Sivakumar V. "A Distributed Simulated Annealing framework for Engineering Optimization." (2003). (Year: 2003).*
Calégari, Patrice Roger. Parallelization of population-based evolutionary algorithms for combinatorial optimization problems. No. 2046. EPFL, 1999 (Year: 1999).*
Wang, Z. G., et al. "Optimization of multi-pass milling using parallel genetic algorithm and parallel genetic simulated annealing." International Journal of Machine Tools and Manufacture 45.15 (2005) (Year: 2005).*
Bendjoudi, Ahcene, Nordine Melab, and El-Ghazali Talbi. "An adaptive hierarchical master-worker (AHMW) framework for grids—Application to B&B algorithms." Journal of Parallel and Distributed Computing 72.2 (2012): 120-131 (Year: 2012).*
Holmqvist, K., Athanasios Migdalas, and Panos M. Pardalos. "Parallelized heuristics for combinatorial search." Parallel computing in optimization (1997): (Year: 1997).*
Voltaire, "Host Channel Adapters (HCAs)", Copyright 2009, URL: cw(dot)infinibandta(dot)org/files/showcase_product/090726(dot)192240(dot)411(dot)HCA-DS-WEB-052709(dot)pdf (Year: 2009).*
Liu, Jiuxing, et al. "MPI over InfiniBand: Early experiences." Ohio State University Technical Report (2003). (Year: 2003).*
E. Crosson et al., "Simulated Quantum Annealing Can Be Exponentially Faster than Classical Simulated Annealing," IEEE 57th Annual Symposium on Foundations of Computer Science (FOCS), pp. 714-723, doi: 10.1109/FOCS.2016.81, arXiv:1601.03030v1, https://ieeexplore.ieee.org/abstract/document/7782986 (2016).
SIPO, Notification to Grant Patent Right in CN App. No. 202080025407.3, 4 pages, and partial machine translation, 2 pages (Nov. 1, 2024).

* cited by examiner

CALCULATION WITH VALUES OF "p" UPDATED IN AT LEAST SOME OF THE TURNS

CALCULATION WITH EACH FIXED VALUE OF "p" CAN BE EXECUTED IN PARALLEL $$H^{(m)}(x^{(m)}) = \sum_i \left( \frac{(D - p^{(m)})}{2} \cdot {x_i^{(m)}}^2 + \frac{D}{2} \cdot {y_i^{(m)}}^2 + \frac{p^{(m)}}{4} \cdot {x_i^{(m)}}^4 + c \cdot h_i \cdot x_i^{(m)} + \sum_j x_j^{(m)} \cdot J_{ij} \cdot x_i^{(m)} \right) \quad \text{(E1)}$$

$$Q = Z \cdot \prod_m Q^{(m)}(x^{(m)}) = Z \cdot \prod_m \exp(-\beta \cdot H^{(m)}(x^{(m)})) \quad \text{(E2)}$$

$$W_{A \to B} \cdot Q_A = W_{B \to A} \cdot Q_B \quad \text{(E3)}$$

$$\left.\begin{aligned} & W_{(m_1, x^{(m_1)}, m_2, x^{(m_2)}) \to (m_1, x^{(m_2)}, m_2, x^{(m_1)})} \cdot Q^{(m_1)}(x^{(m_1)}) \cdot Q^{(m_2)}(x^{(m_2)}) \\ & = W_{(m_1, x^{(m_2)}, m_2, x^{(m_1)}) \to (m_1, x^{(m_1)}, m_2, x^{(m_2)})} \cdot Q^{(m_1)}(x^{(m_2)}) \cdot Q^{(m_2)}(x^{(m_1)}) \end{aligned}\right\} \quad \text{(E4)}$$

$$\left.\begin{aligned} & W_{(m_1, x^{(m_1)}, m_2, x^{(m_2)}) \to (m_1, x^{(m_2)}, m_2, x^{(m_1)})} \cdot \exp\left(-\beta \cdot p^{(m_1)} \cdot \left( \frac{{x^{(m_1)}}^4}{4} - \frac{{x^{(m_1)}}^2}{2} \right)\right) \cdot \exp\left(-\beta \cdot p^{(m_2)} \cdot \left( \frac{{x^{(m_2)}}^4}{4} - \frac{{x^{(m_2)}}^2}{2} \right)\right) \\ & = W_{(m_1, x^{(m_2)}, m_2, x^{(m_1)}) \to (m_1, x^{(m_1)}, m_2, x^{(m_2)})} \cdot \exp\left(-\beta \cdot p^{(m_1)} \cdot \left( \frac{{x^{(m_2)}}^4}{4} - \frac{{x^{(m_2)}}^2}{2} \right)\right) \cdot \exp\left(-\beta \cdot p^{(m_2)} \cdot \left( \frac{{x^{(m_1)}}^4}{4} - \frac{{x^{(m_1)}}^2}{2} \right)\right) \end{aligned}\right\} \quad \text{(E5)}$$

$$\frac{W_{(m_1, x^{(m_1)}, m_2, x^{(m_2)}) \to (m_1, x^{(m_2)}, m_2, x^{(m_1)})}}{W_{(m_1, x^{(m_2)}, m_2, x^{(m_1)}) \to (m_1, x^{(m_1)}, m_2, x^{(m_2)})}} = \exp\left(-\beta \cdot \left( \frac{p^{(m_1)} - p^{(m_2)}}{2} \right) \cdot \left( \frac{{x^{(m_1)}}^2 - {x^{(m_2)}}^2}{2} - \frac{{x^{(m_1)}}^4 - {x^{(m_2)}}^4}{4} \right)\right) \quad \text{(E6)}$$

FIG. 13

INFORMATION PROCESSING DEVICE, SYSTEM, METHOD, AND STORAGE MEDIUM FOR SOLVING COMBINATORIAL OPTIMIZATION PROBLEM

CROSS REFERENCE TO RELATED APPLICATIONS

This application is continuation application of International Application No. JP2020/014190, filed on Mar. 27, 2020, which claims priority to Japanese Patent Application No. 2019-064699, filed on Mar. 28, 2019, the entire contents of which are incorporated herein by reference.

FIELD

Embodiments of the present invention relate to an information processing device, an information processing system, an information processing method, and a storage medium.

BACKGROUND

A combinatorial optimization problem is a problem of selecting a combination most suitable for a purpose from a plurality of combinations. Mathematically, combinatorial optimization problems are attributed to problems for maximizing functions including a plurality of discrete variables, called "objective functions", or minimizing the functions. Although combinatorial optimization problems are common problems in various fields including finance, logistics, transport, design, manufacture, and life science, it is not always possible to calculate an optimal solution due to so-called "combinatorial explosion" that the number of combinations increases in exponential orders of a problem size. In addition, it is difficult to even obtain an approximate solution close to the optimal solution in many cases.

Development of a technique for calculating a solution for the combinatorial optimization problem within a practical time is required in order to solve problems in each field and promote social innovation and progress in science and technology.

BRIEF DESCRIPTION OF DRAWINGS

FIG. 13 is a diagram illustrating an example of a formula related to the replica exchange method.

DETAILED DESCRIPTION

According to one embodiment, an information processing device includes a plurality of arithmetic circuits and a data exchange circuit. The plurality of arithmetic circuits each of which is configured to repeatedly update a first vector which has a first variable as an element and a second vector which has a second variable corresponding to the first variable as an element. Each of the arithmetic circuits is configured to update the first variable based on the corresponding second variable, weight the first variable with a first coefficient and add the weighted first variable to the corresponding second variable, calculate a problem term using a plurality of the first variables, and add the problem term to the second variable, different values are set as the first coefficients in the respective arithmetic circuits. The data exchange circuit is configured to execute at least one of exchange of the first vector and the second vector or exchange of the first coefficients between the arithmetic circuits.

Hereinafter, embodiments of the present invention will be described with reference to the drawings. In addition, the same components will be denoted by the same reference signs, and a description thereof will be omitted as appropriate.

Figure 1:
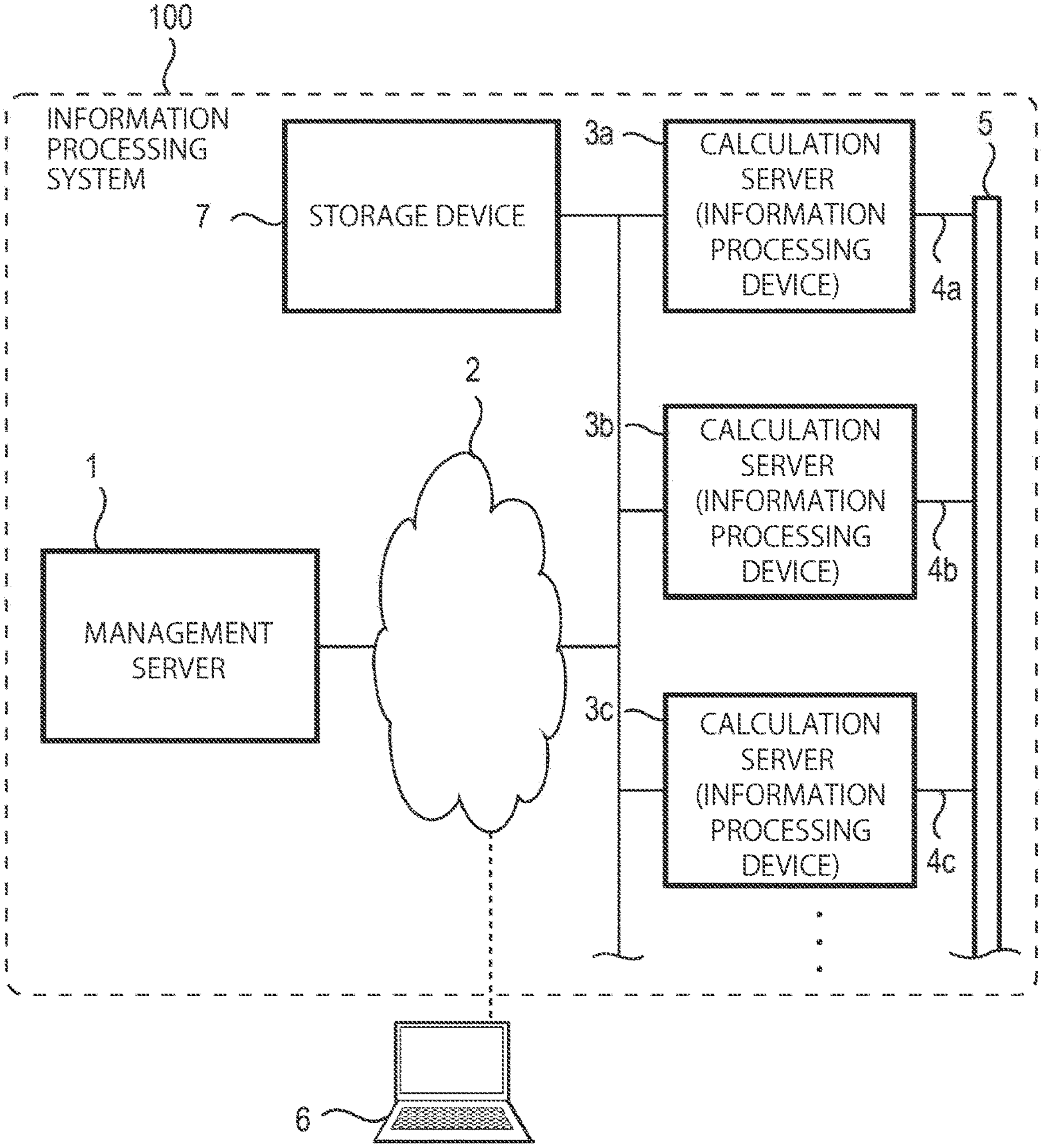
FIG. 1 is a diagram illustrating a configuration example of an information processing system.

FIG. 1 is a block diagram illustrating a configuration example of an information processing system 100. The information processing system 100 of FIG. 1 includes a management server 1, a network 2, calculation servers (information processing devices) 3*a* to 3*c*, cables 4*a* to 4*c*, a switch 5, and a storage device 7. In addition, FIG. 1 illustrates a client terminal 6 that can communicate with the information processing system 100. The management server 1, the calculation servers 3*a* to 3*c*, the client terminal 6, and the storage device 7 can perform data communication with each other via the network 2. For example, the calculation servers 3*a* to 3*c* can store data in the storage device 7 and read data from the storage device 7. The network 2 is, for example, the Internet in which a plurality of computer networks are connected to each other. The network 2 can use a wired or wireless communication medium or a combination thereof. In addition, an example of a communication protocol used in the network 2 is TCP/IP, but a type of communication protocol is not particularly limited.

In addition, the calculation servers 3*a* to 3*c* are connected to the switch 5 via the cables 4*a* to 4*c*, respectively. The cables 4*a* to 4*c* and the switch 5 form interconnection between the calculation servers. The calculation servers 3*a* to 3*c* can also perform data communication with each other via the interconnection. The switch 5 is, for example, an Infiniband switch. The cables 4*a* to 4*c* are, for example, Infiniband cables. However, a wired LAN switch/cable may be used instead of the Infiniband switch/cable. Communication standards and communication protocols used in the cables 4*a* to 4*c* and the switch 5 are not particularly limited. Examples of the client terminal 6 include a notebook PC, a desktop PC, a smartphone, a tablet, and an in-vehicle terminal.

Parallel processing and/or distributed processing can be performed to solve a combinatorial optimization problem. Therefore, the calculation servers 3*a* to 3*c* and/or processors of the calculation servers 3*a* to 3*c* may share and execute some steps of calculation processes, or may execute similar calculation processes for different variables in parallel. For example, the management server 1 converts a combinatorial optimization problem input by a user into a format that can be processed by each calculation server, and controls the calculation server. Then, the management server 1 acquires calculation results from the respective calculation servers, and converts the aggregated calculation result into a solution of the combinatorial optimization problem. In this manner, the user can obtain the solution to the combinatorial optimization problem. It is assumed that the solution of the combinatorial optimization problem includes an optimal solution and an approximate solution close to the optimal solution.

FIG. 1 illustrates three calculation servers. However, the number of calculation servers included in the information processing system is not limited. In addition, the number of calculation servers used for solving the combinatorial optimization problem is not particularly limited. For example, the information processing system may include one calculation server. In addition, a combinatorial optimization problem may be solved using any one of a plurality of calculation servers included in the information processing system. In addition, the information processing system may include several hundred or more calculation servers. The calculation server may be a server installed in a data center or a desktop PC installed in an office. In addition, the calculation server may be a plurality of types of computers installed at different locations. A type of information processing device used as the calculation server is not particularly limited. For example, the calculation server may be a general-purpose computer, a dedicated electronic circuit, or a combination thereof.

Figure 2:
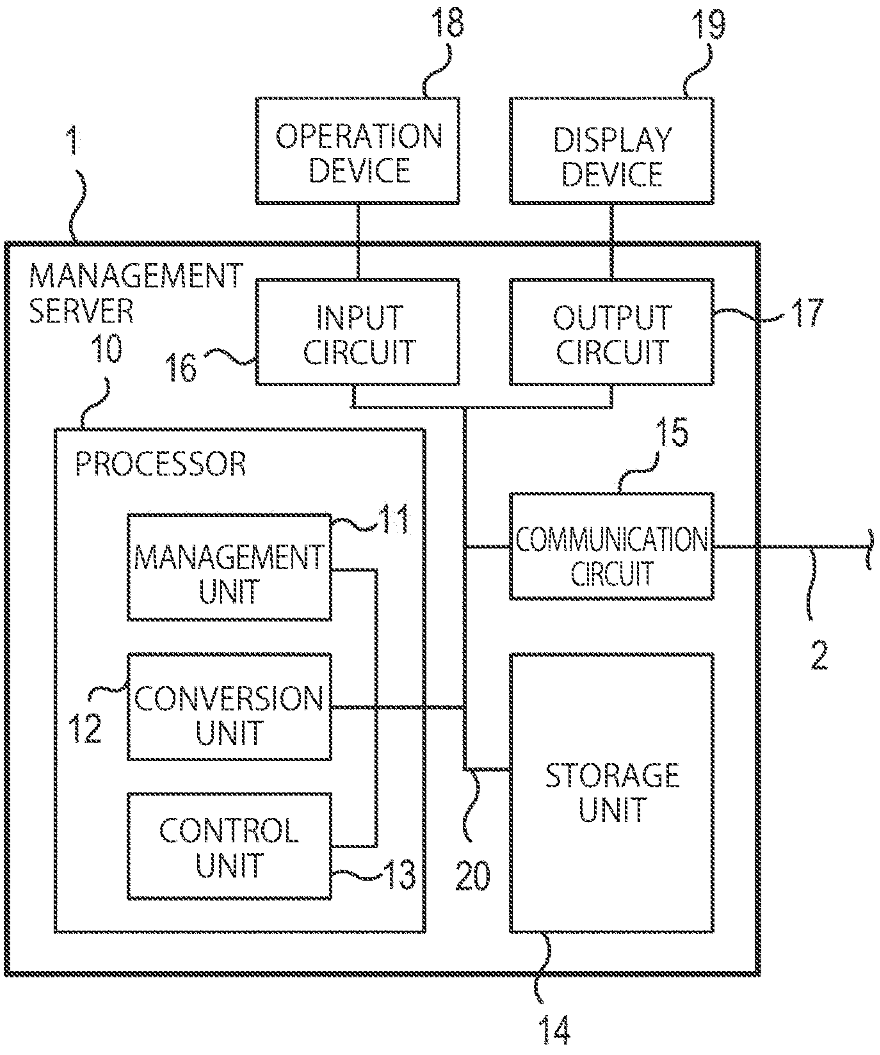
FIG. 2 is a block diagram illustrating a configuration example of a management server.

FIG. 2 is a block diagram illustrating a configuration example of the management server 1. The management server 1 of FIG. 2 is, for example, a computer including a central processing unit (CPU) and a memory. The management server 1 includes a processor 10, a storage unit 14, a communication circuit 15, an input circuit 16, and an output circuit 17. It is assumed that the processor 10, the storage unit 14, the communication circuit 15, the input circuit 16, and the output circuit 17 are connected to each other via a bus 20. The processor 10 includes a management unit 11, a conversion unit 12, and a control unit 13 as internal components.

The processor 10 is an electronic circuit that executes an operation and controls the management server 1. As the processor 10, for example, a CPU, a microprocessor, an ASIC, an FPGA, a PLD, or a combination thereof can be used. The management unit 11 provides an interface configured to operate the management server 1 via the client terminal 6 of the user. Examples of the interface provided by the management unit 11 include an API, a CLI, and a web page. For example, the user can input information of a combinatorial optimization problem via the management unit 11, and browse and/or download a calculated solution of the combinatorial optimization problem. The conversion unit 12 converts the combinatorial optimization problem into a format that can be processed by each calculation server. The control unit 13 transmits a control command to each calculation server. After the control unit 13 acquires calculation results from the respective calculation servers, the conversion unit 12 aggregates the plurality of calculation results and converts the aggregated result into a solution of the combinatorial optimization problem. In addition, the control unit 13 may designate a processing content to be executed by each calculation server or a processor in each server.

The storage unit 14 stores various types of data including a program of the management server 1, data necessary for execution of the program, and data generated by the program. Here, the program includes both an OS and an application. The storage unit 14 may be a volatile memory, a non-volatile memory, or a combination thereof. Examples of the volatile memory include a DRAM and an SRAM. Examples of the non-volatile memory include a NAND flash memory, a NOR flash memory, a ReRAM, or an MRAM. In addition, a hard disk, an optical disk, a magnetic tape, or an external storage device may be used as the storage unit 14.

The communication circuit 15 transmits and receives data to and from each device connected to the network 2. The communication circuit 15 is, for example, a network interface card (NIC) of a wired LAN. However, the communication circuit 15 may be another type of communication circuit such as a wireless LAN. The input circuit 16 implements data input with respect to the management server 1. It is assumed that the input circuit 16 includes, for example, a USB, PCI-Express, or the like as an external port. In the example of FIG. 2, an operation device 18 is connected to the input circuit 16. The operation device 18 is a device configured to input information to the management server 1. The operation device 18 is, for example, a keyboard, a mouse, a touch panel, a voice recognition device, or the like, but is not limited thereto. The output circuit 17 implements data output from the management server 1. It is assumed that the output circuit 17 includes HDMI, DisplayPort, or the like as an external port. In the example of FIG. 2, the display device 19 is connected to the output circuit 17. Examples of the display device 19 include a liquid crystal display (LCD), an organic electroluminescence (EL) display, and a projector, but are not limited thereto.

An administrator of the management server 1 can perform maintenance of the management server 1 using the operation device 18 and the display device 19. Note that the operation device 18 and the display device 19 may be incorporated in the management server 1. In addition, the operation device 18 and the display device 19 are not necessarily connected to the management server 1. For example, an administrator may perform maintenance of the management server 1 using a client terminal capable of communicating with the network 2.

Figure 3:
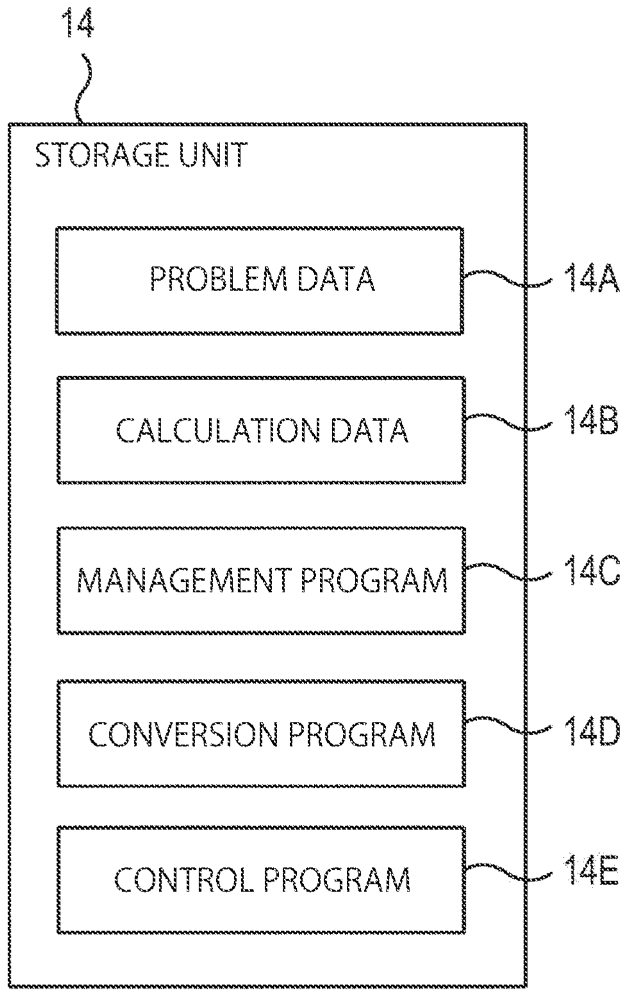
FIG. 3 is a diagram illustrating an example of data stored in a storage unit of the management server.

FIG. 3 illustrates an example of data stored in the storage unit 14 of the management server 1. The storage unit 14 of FIG. 3 stores problem data 14A, calculation data 14B, a management program 14C, a conversion program 14D, and a control program 14E. For example, the problem data 14A includes data of a combinatorial optimization problem. For example, the calculation data 14B includes a calculation result collected from each calculation server. For example, the management program 14C is a program that implements the above-described function of the management unit 11. For example, the conversion program 14D is a program that implements the above-described function of the conversion unit 12. For example, the control program 14E is a program that implements the above-described function of the control unit 13.

Figure 4:
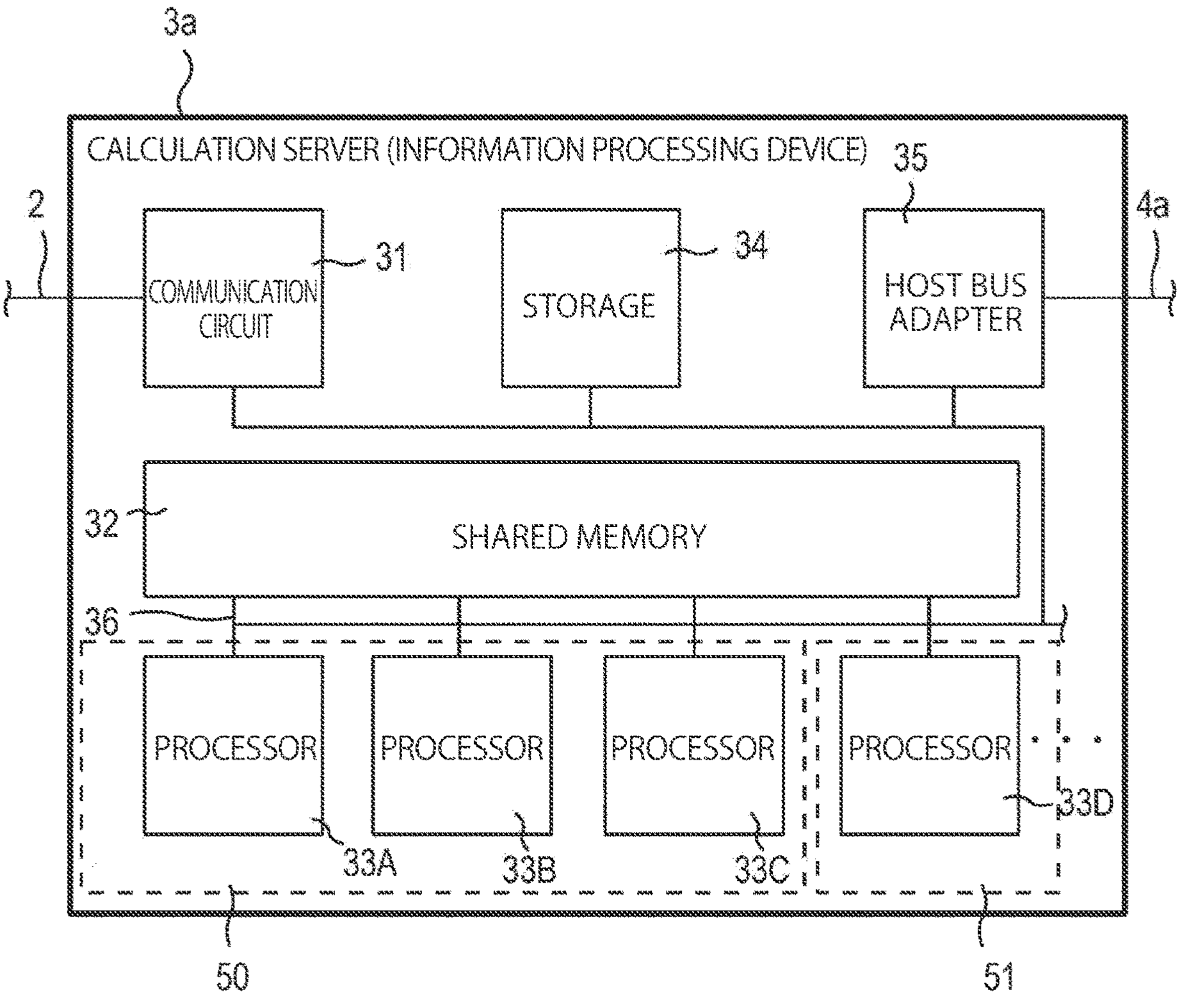
FIG. 4 is a block diagram illustrating a configuration example of a calculation server.

FIG. 4 is a block diagram illustrating a configuration example of the calculation server. FIG. 4 illustrates a configuration of the calculation server 3*a* as an example. The other calculation server may have a configuration similar to that of the calculation server 3*a* or may have a configuration different from that of the calculation server 3*a*. The calculation server 3*a* is, for example, an information processing device that performs calculation of a first vector and a second vector alone or in a shared manner with the other calculation server. In addition, at least one of the calculation servers may calculate a problem term between elements of the first vector. Here, the problem term may be calculated based on an Ising model to be described later. In addition, the problem term may include a many-body interaction to be described later.

For example, the first vector is a vector which has a variable $x_i$ (i=1, 2, . . . , N) or a variable $X^{(m)}_i$ (i=1, 2, . . . , N) as an element. For example, the second vector is a vector which has a variable $y_i$ (i=1, 2, . . . , N) or a variable $Y^{(m)}i$ (i=1, 2, . . . , N) as an element. Here, m represents a replica number of an integer of 1 to M. Details of the replica will be described later.

The calculation server 3*a* includes, for example, a communication circuit 31, a shared memory 32, processors 33A to 33D, a storage 34, and a host bus adapter 35. It is assumed that the communication circuit 31, the shared memory 32, the processors 33A to 33D, the storage 34, and the host bus adapter 35 are connected to each other via a bus 36.

The communication circuit 31 transmits and receives data to and from each device connected to the network 2. The communication circuit 31 is, for example, a network interface card (NIC) of a wired LAN. However, the communication circuit 31 may be another type of communication circuit such as a wireless LAN. The shared memory 32 is a memory accessible from the processors 33A to 33D. Examples of the shared memory 32 include a volatile memory such as a DRAM and an SRAM. However, another type of memory such as a non-volatile memory may be used as the shared memory 32. The processors 33A to 33D can share data via the shared memory 32. Note that all the memories of the calculation server 3*a* are not necessarily configured as shared memories. For example, some of the memories of the calculation server 3*a* may be configured as a local memory that can be accessed only by any processor.

The processors 33A to 33D are electronic circuits that execute calculation processes. The processor may be, for example, any of a central processing unit (CPU), a graphics processing unit (GPU), a field-programmable gate array (FPGA), and an application specific integrated circuit (ASIC), or a combination thereof. In addition, the processor may be a CPU core or a CPU thread. When the processor is the CPU, the number of sockets included in the calculation server 3*a* is not particularly limited. In addition, the processor may be connected to another component of the calculation server 3*a* via a bus such as PCI express.

In the example of FIG. 4, the calculation server includes four processors. However, the number of processors included in one calculation server may be different from this. For example, the number and/or types of processors implemented in the calculation server may be different.

For example, the information processing device is configured to repeatedly update the first vector which has a first variable $x_i$ (i=1, 2, . . . , N) as an element and the second vector which has a second variable $y_i$ (i=1, 2, . . . , N) corresponding to the first variable as an element. The storage unit of the information processing device may be configured to store a first variable which is an element of a first vector and a second variable which is an element of a second vector.

For example, each of a plurality of arithmetic circuits 50 is configured to repeatedly update a first vector having a first variable as an element and a second vector having a second variable corresponding to the first variable as an element. For example, each of the arithmetic circuits 50 is configured to update the first variable based on the corresponding second variable, weight the first variable with a first coefficient and add the weighted first variable to the corresponding second variable, calculate a problem term using the plurality of first variables, and add the problem term to the second variable. In addition, different values may be set as the first coefficient in each of the arithmetic circuits 50. For example, a data exchange circuit 51 is configured to execute at least one of exchange of the first vector and the second vector or exchange of the first coefficients between the arithmetic circuits 50. The problem term calculated by the arithmetic circuit may be based on an Ising model. In addition, the problem term calculated by the arithmetic circuit may include a many-body interaction. Details of the problem term will be described later.

In the example of FIG. 4, the processors 33A to 33C correspond to the plurality of arithmetic circuits, and the processor 33D corresponds to the data exchange circuit. However, the correspondence relationship between the arithmetic circuit or data exchange circuit and the processor illustrated in FIG. 4 is merely an example. Therefore, the correspondence relationship between the arithmetic circuit or data exchange circuit and the processor may be different from this. In addition, the number of processors allocated to the arithmetic circuit or data exchange circuit is not particularly limited. The same processor may also serve as the arithmetic circuit and the data exchange circuit as will be described later. In a case where plural types of processors (for example, a CPU, a GPU, and an FPGA) are implemented in the calculation server, different types of processors may be allocated to the arithmetic circuit and the data exchange circuit.

Here, the case where the processing content is allocated in units of processors has been described as an example. However, a unit of a calculation resource in which the processing content is allocated is not limited. For example, the processing content may be allocated in units of calculators. In this case, the information processing system may include a plurality of first calculators and a second calculator. For example, each of the first calculators is configured to repeatedly update a first vector having a first variable as an element and a second vector having a second variable corresponding to the first variable as an element. For example, the second calculator is configured to execute data exchange between the first calculators. The first calculator and the second calculator correspond to, for example, the above-described calculation server.

Each of the first calculators may be configured to update the first variable based on the corresponding second variable, weight the first variable with a first coefficient and add the weighted first variable to the corresponding second variable, calculate a problem term using the plurality of first variables, and add the problem term to the second variable.

The second calculator may be configured to execute at least one of exchange of the first vector and the second vector or exchange of the first coefficients between the first calculators. In addition, different values may be set as the first coefficient in each of the first calculators.

Hereinafter, components of the calculation server will be described with reference to FIG. 4 again.

The storage 34 stores various data including a program of the calculation server 3*a*, data necessary for executing the program, and data generated by the program. Here, the program includes both an OS and an application. The storage 34 may be a volatile memory, a non-volatile memory, or a combination thereof. Examples of the volatile memory include a DRAM and an SRAM. Examples of the non-volatile memory include a NAND flash memory, a NOR flash memory, a ReRAM, or an MRAM. In addition, a hard disk, an optical disk, a magnetic tape, or an external storage device may be used as the storage 34.

The host bus adapter 35 implements data communication between the calculation servers. The host bus adapter 35 is connected to the switch 5 via the cable 4*a*. The host bus adapter 35 is, for example, a host channel adaptor (HCA). The speed of parallel calculation processes can be improved by forming interconnection capable of achieving a high throughput using the host bus adapter 35, the cable 4*a*, and the switch 5.

Figure 5:
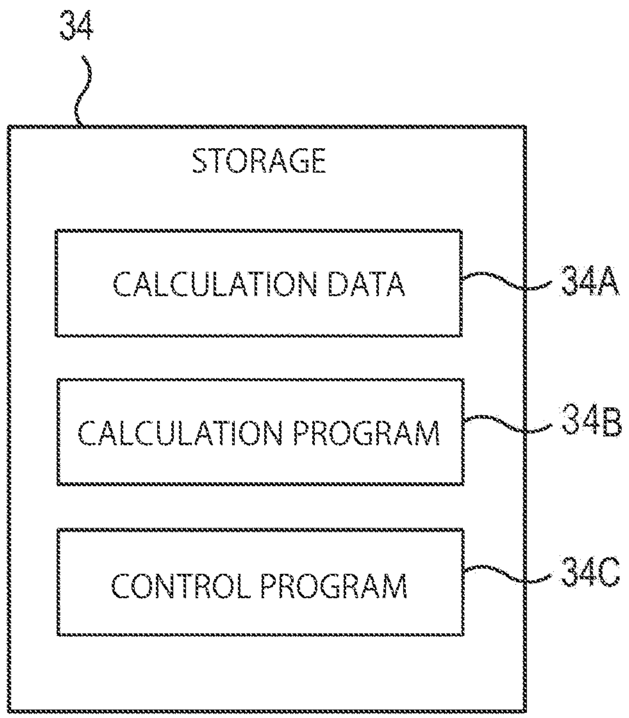
FIG. 5 is a diagram illustrating an example of data stored in a storage of the calculation server.

FIG. 5 illustrates an example of data stored in the storage of the calculation server. The storage 34 of FIG. 5 stores calculation data 34A, a calculation program 34B, and a control program 34C. The calculation data 34A includes data in the middle of calculation by the calculation server 3*a* or a calculation result. Note that at least a part of the calculation data 34A may be stored in a different storage hierarchy such as the shared memory 32, a cache of the processor, and a register of the processor. The calculation program 34B is a program that implements a calculation process in each processor and a process of storing data in the shared memory 32 and the storage 34 based on a predetermined algorithm. The control program 34C is a program that controls the calculation server 3*a* based on a command transmitted from the control unit 13 of the management server 1 and transmits a calculation result of the calculation server 3*a* to the management server 1.

Next, a technique related to solving a combinatorial optimization problem will be described. An example of the information processing device used to solve the combinatorial optimization problem is an Ising machine. The Ising machine refers to an information processing device that calculates the energy of a ground state of an Ising model. Hitherto, the Ising model has been mainly used as a model of a ferromagnet or a phase transition phenomenon in many cases. In recent years, however, the Ising model has been increasingly used as a model for solving a combinatorial optimization problem. The following Formula (1) represents the energy of the Ising model.

[Formula 1]

$$E_{Ising} = \sum_{i=1}^{N} h_i s_i + \frac{1}{2}\sum_{i=1}^{N}\sum_{j=1}^{N} J_{i,j} s_i s_j \tag{1}$$

Here, $s_i$ and $s_j$ are spins, and the spins are binary variables each having a value of either +1 or −1. N is the number of spins. Further, $h_i$ is a local magnetic field acting on each spin. J is a matrix of coupling coefficients between spins. The matrix J is a real symmetric matrix whose diagonal components are 0. Therefore, $J_{ij}$ indicates an element in row i and column j of the matrix J. Note that the Ising model of Formula (1) is a quadratic expression for the spin, but an extended Ising model (Ising model having a many-body interaction) including a third-order or higher-order term of the spin may be used.

When the Ising model of Formula (1) is used, energy $E_{Ising}$ can be used as an objective function, and it is possible to calculate a solution that minimizes energy $E_{Ising}$ as much as possible. The solution of the Ising model is expressed in a format of a spin vector $(s_1, s_2, \ldots, s_N)$. In particular, the vector $(s_1, s_2, \ldots, s_N)$ having the minimum value of the energy $E_{Ising}$ is referred to as an optimal solution. However, the solution of the Ising model to be calculated is not necessarily a strictly optimal solution. Hereinafter, a problem of obtaining an approximate solution (that is, an approximate solution in which a value of the objective function is as close as possible to the optimal value) in which the energy $E_{Ising}$ is minimized as much as possible using the Ising model is referred to as an Ising problem.

Since the spin $s_i$ in Formula (1) is a binary variable, conversion with a discrete variable (bit) used in the combinatorial optimization problem can be easily performed using Formula $(1+s_i)/2$. Therefore, it is possible to obtain a solution of the combinatorial optimization problem by converting the combinatorial optimization problem into the Ising problem and causing the Ising machine to perform calculation. A problem of obtaining a solution that minimizes a quadratic objective function having a discrete variable (bit), which takes a value of either 0 or 1, as a variable is referred to as a quadratic unconstrained binary optimization (QUBO) problem. It can be said that the Ising problem represented by Formula (1) is equivalent to the QUBO problem.

For example, a quantum annealer, a coherent Ising machine, a quantum bifurcation machine have been proposed as hardware implementations of the Ising Machine. The quantum annealer implements quantum annealing using a superconducting circuit. The coherent Ising machine uses an oscillation phenomenon of a network formed by an optical parametric oscillator. The quantum bifurcation machine uses a quantum mechanical bifurcation phenomenon in a network of a parametric oscillator with the Kerr effect. These hardware implementations have the possibility of significantly reducing a calculation time, but also have a problem that it is difficult to achieve scale-out and a stable operation.

Therefore, it is also possible to solve the Ising problem using a widely-spread digital computer. As compared with the hardware implementations using the above-described physical phenomenon, the digital computer facilitates the scale-out and the stable operation. An example of an algorithm for solving the Ising problem in the digital computer is simulated annealing (SA). A technique for performing simulated annealing at a higher speed has been developed. However, general simulated annealing is a sequential updating algorithm where each of variables is updated sequentially, and thus, it is difficult to speed up calculation processes by parallelization.

Taking the above-described problem into consideration, a simulated bifurcation algorithm, capable of solving a large-scale combinatorial optimization problem at a high speed by parallel calculation in the digital computer, has been proposed. Hereinafter, a description will be given regarding an information processing device, an information processing system, an information processing method, a storage medium, and a program for solving a combinatorial optimization problem using the simulated bifurcation algorithm.

First, an overview of the simulated bifurcation algorithm will be described.

In the simulated bifurcation algorithm, a simultaneous ordinary differential equation in (2) below is numerically solved for each of two variables $x_i$ and $y_i$ (i=1, 2, . . . , N), the number of each of the variables being N. Each of the N variables $x_i$ corresponds to the spin $s_i$ of the Ising model. On the other hand, each of the N variables $y_i$ corresponds to the momentum. It is assumed that both the variables $x_i$ and $y_i$ are continuous variables. Hereinafter, a vector having the variable $x_i$ (i=1, 2, . . . , N) as an element is referred to as a first vector, and a vector having the variable $y_i$ (i=1, 2, . . . , N) as an element is referred to as a second vector.

[Formula 2]

$$\frac{dx_i}{dt} = \frac{\partial H}{\partial y_i} = Dy_i \tag{2}$$

$$\frac{dy_i}{dt} = -\frac{\partial H}{\partial x_i} = \{-D + p(t) - Kx_i^2\}x_i - ch_i a(t) - c\sum_{j=1}^{N} J_{ij}x_j$$

Here, H is a Hamiltonian of the following Formula (3).

[Formula 3]

$$H = \sum_{i=1}^{N}\left[\frac{D}{2}(x_i^2 + y_i^2) - \frac{p(t)}{2}x_i^2 + \frac{K}{4}x_i^4 + ch_i x_i a(t) + \frac{c}{2}\sum_{j=1}^{N} J_{ij}x_i x_j\right] \tag{3}$$

Values of the variables $x_i$ and $y_i$ (i=1, 2, . . . , N) can be repeatedly updated to obtain the spin $s_i$ (i=1, 2, . . . , N) of the Ising model by calculating the time evolution of the simulated bifurcation algorithm. That is, when the time evolution is calculated, a value of the element of the first vector and a value of the element of the second vector are repeatedly updated. Here, each coefficient will be described assuming that the calculation of the time evolution is performed. However, in the simulated bifurcation algorithm, it is not always necessary to perform the calculation of the time evolution. For example, a solution of the simulated bifurcation algorithm may be obtained by a replica exchange method (parallel tempering) as will be described later.

In (2) and (3), a coefficient D corresponds to detuning. A coefficient p(t) corresponds to a pumping amplitude. When the time evolution of the simulated bifurcation algorithm is calculated, a value of the coefficient p(t) monotonically increases depending on the number of updates. An initial value of the coefficient p(t) may be set to 0. A coefficient K corresponds to a positive Kerr coefficient. As a coefficient c, a constant coefficient can be used. For example, a value of the coefficient c may be determined before execution of calculation according to the simulated bifurcation algorithm. For example, the coefficient c can be set to a value close to an inverse number of the maximum eigenvalue of the $J^{(2)}$ matrix. For example, a value of $c=0.5D\sqrt{(N/2n)}$ can be used. Here, n is the number of edges of a graph related to the combinatorial optimization problem. In addition, a(t) is a coefficient that increases with p(t) at the time of calculating the time evolution. For example, $\sqrt{(p(t)/K)}$ can be used as a(t). Note that the vector $h_i$ of the local magnetic field in (3) and (4) can be omitted.

In the case of calculating the time evolution, a solution vector having the spin $s_i$ as an element can be obtained by converting the variable $x_i$ which is a positive value into +1 and the variable $x_i$ which is a negative value into −1 in the first vector when the value of the coefficient p(t) exceeds a predetermined value. This solution vector corresponds to the solution of the Ising problem. Note that it may be determined whether to obtain a solution vector by executing the above-described conversion based on the number of updates of the first vector and the second vector.

In the case of calculating the time evolution of the simulated bifurcation algorithm, the above-described (2) can be converted into a discrete recurrence formula using the Symplectic Euler method to obtain the solution. The following (4) represents an example of the simulated bifurcation algorithm after conversion into the recurrence formula.

[Formula 4]

$$x_i(t + \Delta t) = x_i(t) + Dy_i(t)\Delta t \tag{4}$$

$$y_i(t + \Delta t) = y_i(t) + [\{-D + p(t + \Delta t) - Kx_i^2(t + \Delta t)\}x_i(t + \Delta t) - ch_i a(t + \Delta t)]\Delta t - c\Delta t\sum_{j=1}^{N} J_{i,j}x_j(t + \Delta t)$$

Here, t is time, and Δt is a time step (time increment). Note that time t and a time step Δt are used to indicate the correspondence relationship with the differential equation in (4). However, the time t and the time step Δt are not necessarily included as explicit parameters when actually implementing the algorithm in software or hardware. For example, if the time step Δt is 1, the time step Δt can be removed from the algorithm at the time of implementation. In a case where the time t is not included as the explicit parameter when the algorithm is implemented, $x_i(t+\Delta t)$ may be interpreted as an updated value of $x_i(t)$ in (4). That is, "t" in the above-described (4) indicates a value of the variable before update, and "t+Δt" indicates a value of the variable after update.

In the case of calculating the time evolution of the simulated bifurcation algorithm, the value of the spin $s_i$ can be obtained based on the sign of the variable $x_i$ after increasing the value of p(t) from the initial value (for example, 0) to a predetermined value. For example, if a signum function of $\mathrm{sgn}(x_i)=1$ when $x_i>0$ and $\mathrm{sgn}(x_i)=-1$ when $x_i<0$ is used, the value of the spin $s_i$ can be obtained by converting the variable $x_i$ with the signum function when the value of p(t) increases to the predetermined value. As the signum function, for example, a function that satisfies $\mathrm{sgn}(x_i)=x_i/|x_i|$ when $x_i\neq 0$ and $\mathrm{sgn}(x_i)=1$ or −1 when $x_i=0$ can be used. A timing of obtaining the solution (for example, the spin $s_i$ of the Ising model) of the combinatorial optimization problem is not particularly limited. For example, the solution (solution vector) of the combinatorial optimization problem may be obtained when the number of updates of the first vector and the second vector or the value of the first coefficient p becomes larger than a threshold.

Figure 6:
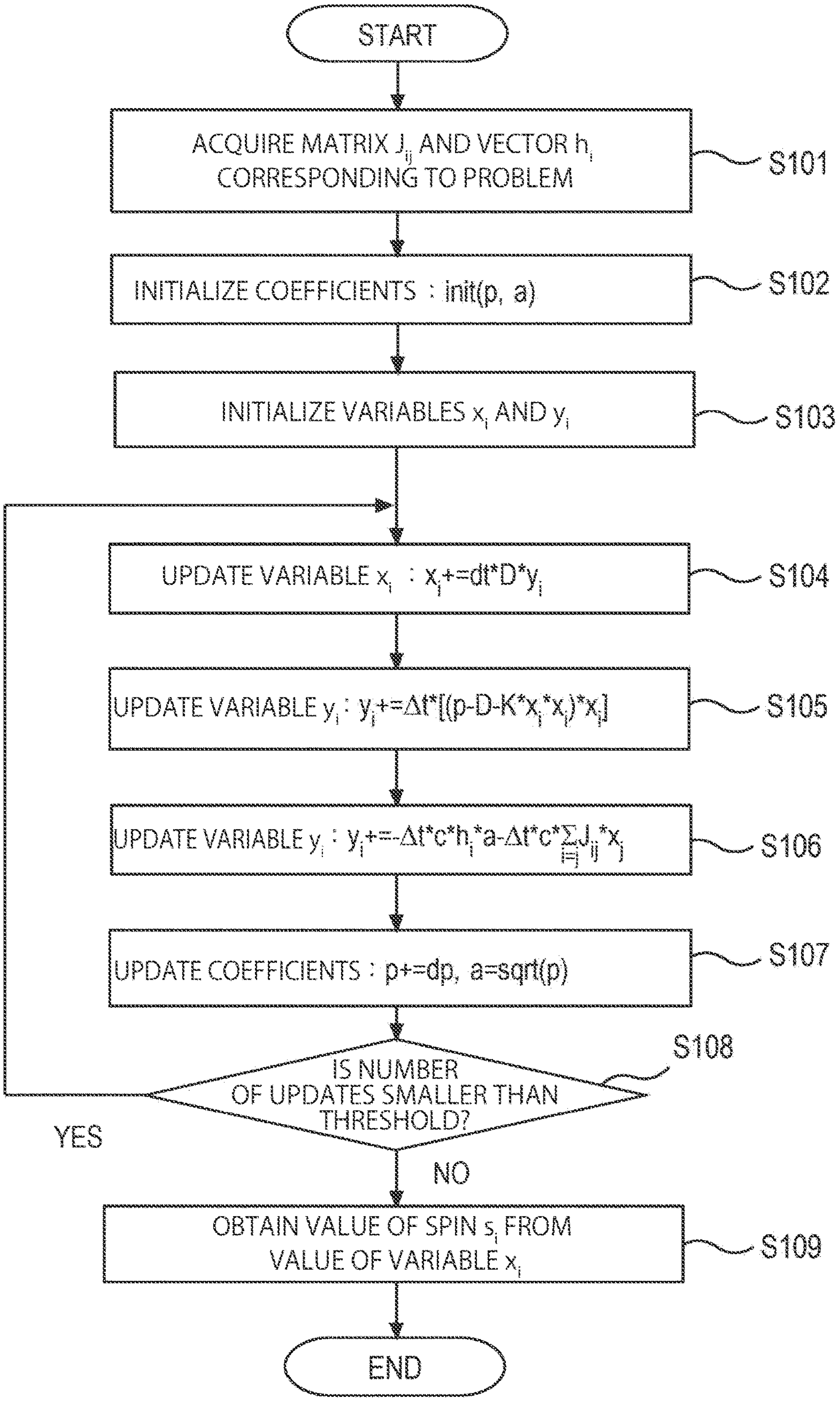
FIG. 6 is a flowchart illustrating an example of processing in a case where a solution of a simulated bifurcation algorithm is calculated by time evolution.

The flowchart of FIG. 6 illustrates an example of processing in the case where the solution of the simulated bifurcation algorithm is calculated by the time evolution. Hereinafter, the processing will be described with reference to FIG. 6.

First, the calculation server acquires the matrix $J_{ij}$ and the vector $h_i$ corresponding to a problem from the management server 1 (step S101). Then, the calculation server initializes the coefficients p(t) and a(t) (step S102). For example, values of the coefficients p and a can be set to 0 in step S102, but the initial values of the coefficients p and a are not limited. Next, the calculation server initializes the first variable $x_i$ and the second variable $y_i$ (step S103). Here, the first variable $x_i$ is an element of the first vector. In addition, the second variable $y_i$ is an element of the second vector. In step S103, the calculation server may initialize $x_i$ and $y_i$ using pseudorandom numbers, for example. However, a method for initializing $x_i$ and $y_i$ is not limited. In addition, the variables may be initialized at different timings, or at least one of the variables may be initialized a plurality of times.

Next, the calculation server updates the first vector by performing weighted addition on the element $y_i$ of the second vector corresponding to the element $x_i$ of the first vector (step S104). For example, $\Delta t \times D \times y_i$ can be added to the variable $x_i$ in step S104. Then, the calculation server updates the element $y_i$ of the second vector (steps S105 and S106). For example, $\Delta t \times [(p-D-K \times x_i \times x_i) \times x_i]$ can be added to the variable $y_i$ in step S105. In step S106, $-\Delta t \times c \times h_i \times a - \Delta t \times c \times \Sigma J_{ij} \times x_j$ can be further added to the variable yi.

Next, the calculation server updates the values of the coefficients p and a (step S107). For example, a constant value (Op) may be added to the coefficient p, and the coefficient a may be set to a positive square root of the updated coefficient p. However, this is merely an example of a method for updating the values of the coefficients p and a as will be described later. Then, the calculation server determines whether the number of updates of the first vector and the second vector is smaller than the threshold (step S108). When the number of updates is smaller than the threshold (YES in step S108), the calculation server executes the processes of steps S104 to S107 again. When the number of updates is equal to or larger than the threshold (NO in step S108), the spin $s_i$, which is the element of the solution vector, is obtained based on the element $x_i$ of the first vector (step S109). In step S109, the solution vector can be obtained, for example, in the first vector by converting the variable $x_i$ which is the positive value into +1 and the variable $x_i$ which is the negative value into −1.

Note that when the number of updates is smaller than the threshold in the determination in step S108 (YES in step S108), a value of the Hamiltonian may be calculated based on the first vector, and the first vector and the value of the Hamiltonian may be stored. As a result, a user can select an approximate solution closest to the optimal solution from the plurality of first vectors.

Note that at least one of the processes illustrated in the flowchart of FIG. 6 may be executed in parallel. For example, the processes of steps S104 to S106 may be executed in parallel such that at least some of the N elements included in each of the first vector and the second vector are updated in parallel. For example, the processes may be performed in parallel using a plurality of calculation servers. The processes may be performed in parallel by a plurality of processors. However, an implementation for realizing parallelization of the processes and a mode of the parallelization of the processes are not limited.

The execution order of processes of updating the variables $x_i$ and $y_i$ illustrated in steps S105 to S106 described above is merely an example. Therefore, the processes of updating the variables $x_i$ and $y_i$ may be executed in a different order. For example, the order in which the process of updating the variable $x_i$ and the process of updating the variable $y_i$ are executed may be interchanged. In addition, the order of sub-processing included in the process of updating each variable is not limited. For example, the execution order of the addition process included in the process of updating the variable $y_i$ may be different from the example of FIG. 6. The execution order and timing of processing as a precondition for executing the process of updating each variable are also not particularly limited. For example, the calculation process of the problem term may be executed in parallel with other processes including the process of updating the variable $x_i$. The same applies to the processing in each flowchart to be described hereinafter, in that the execution order and timings of the processes of updating the variables $x_i$ and $y_i$, the sub-processing included in the process of updating each variable, and the calculation process of the problem term are not limited.

Figure 7:
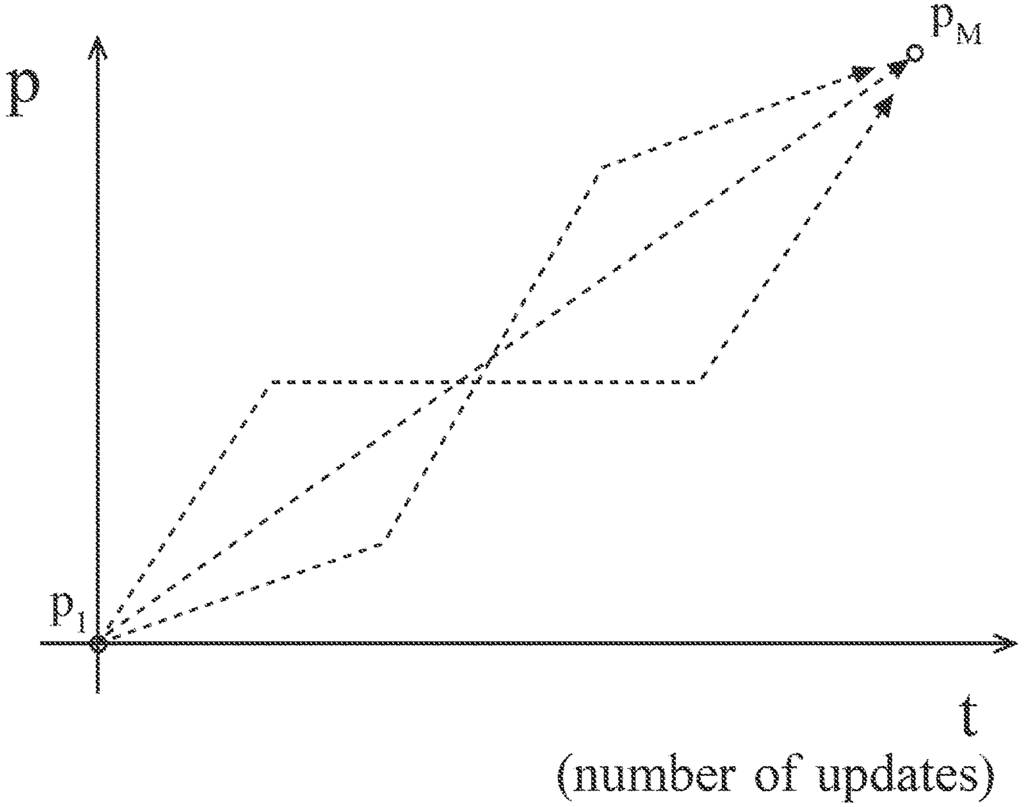
FIG. 7 is a graph illustrating an example of an update pattern of a coefficient p in a case where calculation of time evolution is performed.

A graph of FIG. 7 illustrates an example of an update pattern of the coefficient p in the case of performing the calculation of time evolution. The vertical axis in FIG. 7 represents the value of the coefficient p. The horizontal axis in FIG. 7 corresponds to time or the number of updates. FIG. 7 illustrates that there are a plurality of update patterns from the initial value $p_1$ to $p_M$, which is a value obtained after M updates. If a condition of $p_1<p_M$ is satisfied, $p_1$ and $p_M$ can be set to arbitrary real numbers. In this manner, it can be said that there are an infinite number of update patterns of the coefficient p.

Note that the coefficient p in the simulated bifurcation algorithm corresponds to an inverse number of a temperature T in simulated annealing (SA). Therefore, a transition probability of a particle can be adjusted depending on the coefficient p. The smaller the coefficient p, the higher the transition probability of the particle. On the other hand, the larger the coefficient p, the lower the transition probability of the particle. Therefore, it can be said that the update pattern of the coefficient p in the simulated bifurcation algorithm corresponds to a cooling schedule in the simulated annealing.

For example, as illustrated in FIG. 7, the coefficient p may be incremented at a constant rate depending on the number of updates. In addition, the coefficient p may be incremented by different increments depending on the update timing. Further, the value of the coefficient p may be updated at some update timings, and the update of the value of the coefficient p may be skipped at the remaining update timings.

In a process of obtaining the simulated bifurcation algorithm, it is desirable to search as wide a region as possible in a solution space including a plurality of local solutions to reach an optimal solution of a problem or an approximate solution close thereto. The update patterns of the coefficients p and a designate a region of the solution space to be searched and the granularity of search. Therefore, it is necessary to adjust the update patterns of the coefficients p and a such that a global optimal solution can be easily found. In general, however, it is not always easy to find an optimal update pattern for each problem to be solved. A case where a user will try different update patterns and empirically select an update pattern to use is also assumed.

Therefore, the solution of the simulated bifurcation algorithm may be obtained by the replica exchange method instead of the calculation of the time evolution.

Figure 8:
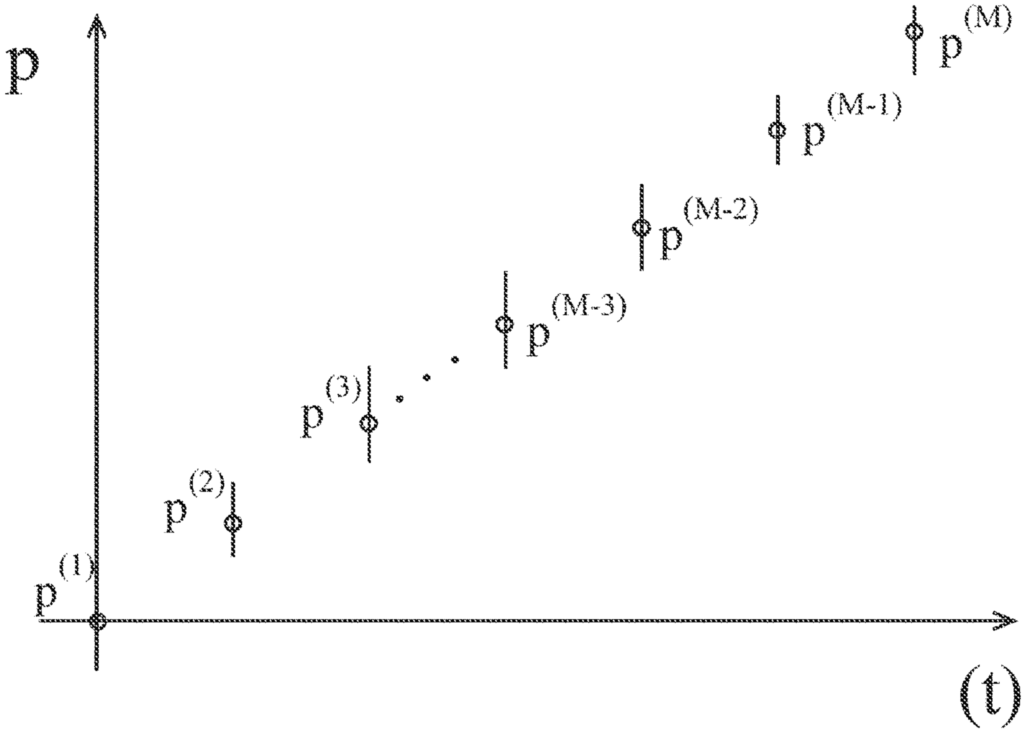
FIG. 8 is a graph conceptually illustrating the coefficient p used in a case where calculation is performed using a replica exchange method.

FIG. 8 conceptually illustrates the coefficient p used in a case where calculation is performed using the replica exchange method. The vertical axis in FIG. 8 represents the value of the coefficient p. In the case where the calculation is performed using the replica exchange method, the information processing device does not necessarily calculate the time evolution of the coefficient p. Therefore, the horizontal axis of FIG. 8 represents a virtual axis prepared for comparison with FIG. 7.

When the replica exchange method is used as illustrated in FIG. 8, a first vector and a second vector are updated for each combination ($p^{(1)}$, $p^{(2)}$, . . . , $p^{(M)}$) of a plurality of determined coefficients p. In the following description, the first vector and the second vector prepared for each coefficient p are referred to as replicas. Then, the solution search in different regions in the solution space can be implemented by performing exchange of the first vector and the second vector between the replicas. In the replica exchange method, it is possible to increase the probability of reaching the optimal solution of the problem or the approximate solution close thereto by repeating the exchange of the first vector and the second vector.

For example, the replica may be allocated to each of the processors of the calculation server. Further, the replica may be allocated to each of the calculation servers in the information processing system. In addition, the amount of calculation resources to be allocated may be different depending on the replica. Types or combinations of the calculation resources to be allocated may be different depending on the replica. However, a method for allocating the calculation resource to each replica is not limited.

When the replica exchange method is used, calculation of the first vector, the second vector, and functions thereof in the respective replicas can be performed in parallel (first-level parallelization). In addition, processes of updating the first vector and the second vector each including a plurality of elements can also be performed in parallel (second-level parallelization). The granularity at which the first-level parallelization is performed and the granularity at which the second-level parallelization is performed in the calculation resources may be different. The latter granularity may be set to be larger than the former granularity. For example, the first-level parallelization can be realized by the granularity of the calculation server or a virtual machine. In addition, the second-level parallelization can be realized by the granularity of the processor. When the replica exchange method is used, processes at a plurality of levels can be parallelized, and thus, calculation can be efficiently performed. Therefore, it is possible to obtain the optimal solution of the problem or the approximate solution close thereto in a relatively short time.

[Case where Combination of Coefficients p is Automatically Determined]

First, processing in a case where a combination of coefficients p to be used is automatically determined when performing calculation using the replica exchange method will be described.

For example, a case where a Hamiltonian of the following Formula (5) is used is assumed.

[Formula 5]

$$H=\sum_{i=1}^{N}\left[\frac{D}{2}(x_i^2+y_i^2)-\frac{p(t)}{2}x_i^2+\frac{K}{4}x_i^4+ch_ix_ia(t)+\frac{c}{2}\sum_{j=1}^{N}J_{ij}x_ix_j\right] \tag{5}$$

Here, for example, √(p(t)) can be used as a(t).

In Formula (5), when scaling is performed with $a(t)X_i=x_i$ and $a(t)Y_i=y_i$, the following Formula (6) is obtained.

[Formula 6]

$$H=\sum_{i=1}^{N}\left[\frac{D}{2}(X_i^2+Y_i^2)-\frac{p(t)}{2}X_i^2+\frac{K}{4}X_i^4+ch_iX_i+\frac{c}{2}\sum_{j=1}^{N}J_{ij}X_iX_j\right] \tag{6}$$

When the replica exchange method is used, the Hamiltonian is calculated for each replica. Therefore, notation such as the following Formula (7) is used to indicate the corresponding replica m (m=1, 2, . . . , M) in the following description.

[Formula 7]

$$H'^{(m)}=\sum_{i=1}^{N}\left[\frac{D}{2}(X_i^{(m)2}+Y_i^{(m)2})-\frac{p^{(m)}(t)}{2}X_i^{(m)2}+\frac{K}{4}X_i^{(m)4}+ch_iX_i^{(m)}+\frac{c}{2}\sum_{j=1}^{N}J_{ij}X_i^{(m)}X_j^{(m)}\right] \tag{7}$$

In order to guarantee convergence to a statistical dynamic equilibrium distribution, a probability W ($m_1$, $m_1+1$) of transition from a replica $m_1$ to a replica $m_1+1$ and a probability W ($m_1+1$, $m_1$) of transition from the replica $m_1+1$ to the replica $m_1$ are subjected to a detailed balance condition of the following Formula (8). A coefficient β corresponds to an inverse temperature in general simulated annealing. Since the combination of coefficients p ($p^{(1)}$, $p^{(2)}$, . . . , $p^{(M)}$) is allocated to each replica of the replica exchange method, a finite positive constant can be used as the coefficient β.

[Formula 8]

$$W(m_1,m_1+1)\exp\left(-\beta H^{(m_1)},\left(X_i^{(m_1)},Y_i^{(m_1)}\right)\right)\exp\left(-\beta H^{(m_1+1)},\left(X_i^{(m_1+1)},Y_i^{(m_1+1)}\right)\right)=W(m_1+1,m_1)\exp\left(-\beta H^{(m_1+1)},\left(X_i^{(m_1)},Y_i^{(m_1)}\right)\right)\exp\left(-\beta H^{(m_1)},\left(X_i^{(m_1+1)},Y_i^{(m_1+1)}\right)\right) \tag{8}$$

In addition, the exchange probability between the replica $m_1$ and the replica $m_1+1$ is expressed by the following Formula (9).

[Formula 9]

$$\frac{W(m_1,m_1+1)}{W(m_1+1,m_1)}=\exp\left(-\beta(p^{(m_1)}-p^{(m_1+1)})\sum_{i=1}^{N}\left[\frac{X_i^{(m_1)^2}-X_i^{(m_1+1)^2}}{2}-\frac{X_i^{(m_1)^4}-X_i^{(m_1+1)^4}}{4}\right]\right) \tag{9}$$

For example, the data exchange circuit 51 can compare a value of Formula (9) with a pseudo random number in the range of 0 or more and less than 1, and make a condition determination based on a magnitude relation between the former value and the latter value. When the latter value is larger than the former value, the condition determination is positive, and the data exchange circuit 51 can exchange the first vector and the second vector between the replica $m_1$ and the replica $m_1+1$. On the other hand, when the latter value is larger than the former value, the condition determination is negative, and the process of exchanging the first vector and the second vector between the replica $m_1$ and the replica $m_1+1$ can be skipped.

For example, each replica may be allocated to each arithmetic circuit. In this case, the data exchange circuit may be configured to execute a condition determination for each pair of the arithmetic circuits, and execute at least one of exchange of the first vector and the second vector used for calculation between the arithmetic circuits or exchange of the first coefficients when the condition determination is positive. In addition, the data exchange circuit may be configured to execute the condition determination based on the first vectors (a plurality of first variables), the second vectors (a plurality of second variables), and the first coefficients in the arithmetic circuits included in the pair. For example, the condition determination may be performed using Formula (9), or the condition determination may be performed using another formula.

Each replica may be allocated to each calculator. In this case, the second calculator of the information processing system may be configured to execute a condition determination for each pair of the first calculators, and execute at least one of exchange of the first vector and the second vector used for calculation between the first calculators or exchange of the first coefficients when the condition determination is positive.

In the replica exchange method, it is preferable to set a value of a coefficient $p^{(m)}$ in each replica such that the exchange probability is constant regardless of the difference in the value of the coefficient p in order to implement efficient calculation (convergence to an equilibrium state). In particular, it is known that a value of the exchange probability between replicas becomes constant if the value of each coefficient $p^{(m)}$ is set such that the values of the coefficients $p^{(m)}$ (m=1, 2, . . . , M) in a plurality of replicas form a geometric progression. Therefore, calculation may be performed using a combination (m=1, 2, . . . , M) of the coefficients $p^{(m)}$ forming the geometric progression as the coefficients $p^{(m)}$ in the respective replicas. That is, the first coefficients (for example, the coefficient p) used in the respective arithmetic circuits may have the relation of the geometric progression. However, a method for determining the value of the coefficient $p^{(m)}$ (m=1, 2, . . . , M) used in the calculation by the replica exchange method is not limited.

In each replica, a process of numerically solving the following simultaneous ordinary differential equation of (10) is executed for each of N two variables $X^{(m)}$, and $Y^{(m)}_i$ (i=1, 2, . . . , N). Each of the N variables $X^{(m)}_i$ corresponds to the spin $s_i$ of the Ising model. On the other hand, each of the N variables $Y^{(m)}_i$ corresponds to the momentum. It is assumed that both the variables $X^{(m)}_i$ and $Y^{(m)}_i$ are continuous variables. Hereinafter, a vector having the variable $X^{(m)}_i$ (i=1, 2, . . . , N) as an element is referred to as a first vector, and a vector having the variable $Y^{(m)}_i$ (i=1, 2, . . . , N) as an element is referred to as a second vector.

[Formula 10]

$$\frac{\partial Y_i^{(m)}}{\partial t} = -\frac{\partial H'^{(m)}}{\partial X_i^{(m)}} = -\left[\left(D - p^{(m)} + KX_i^{(m)2}\right)X_i^{(m)} + ch_i + c\sum_{j=1}^{N} J_{ij}X_j^{(m)}\right] \tag{10}$$

$$\frac{\partial X_i^{(m)}}{\partial t} = \frac{\partial H'^{(m)}}{\partial Y_i^{(m)}} = DY_i^{(m)}$$

The above-described (10) can be converted into a discrete recurrence formula using the Symplectic Euler method to perform calculation of the simulated bifurcation algorithm by the replica exchange method. The following (11) represents an example of the simulated bifurcation algorithm after being converted into the recurrence formula.

[Formula 11]

$$X_i^{(m1)}(t+\Delta t) = X_i^{(m1)}(t) + DY_i^{(m1)}(t)\Delta t \tag{11}$$

$$Y_i^{(m1)}(t+\Delta t) = Y_i^{(m1)}(t) + [\{-D + p^{(m1)}(t+\Delta t) - KX_i^{(m1)}(t+\Delta t)X_i^{(m1)}(t+\Delta t)\}X_i^{(m1)}(t+\Delta t)]\Delta t - ch_i a(t+\Delta t)\Delta t - c\Delta t\sum_{j=1}^{N} J_{i,j}X_j^{(m1)}(t+\Delta t)$$

Note that the following term (12) in (11) is derived from the Ising energy. Since a format of this term is determined depending on a problem to be solved, the term is referred to as a problem term.

[Formula 12]

$$-ch_i a(t+\Delta t)\Delta t - c\Delta t\sum_{j=1}^{N} J_{i,j}X_j^{(m1)}(t+\Delta t) \tag{12}$$

A problem term different from (12) may be used in the calculation as will be described later.

When the simulated bifurcation algorithm is calculated by the replica exchange method as described above, the parallelism of processes can be enhanced, and the optimal solution of the problem or the approximate solution close thereto can be obtained in a relatively short time. In particular, the use of the above-described method in which the combination of coefficients p is automatically determined facilitates implementation and execution of the simulated bifurcation algorithm.

Figure 9:
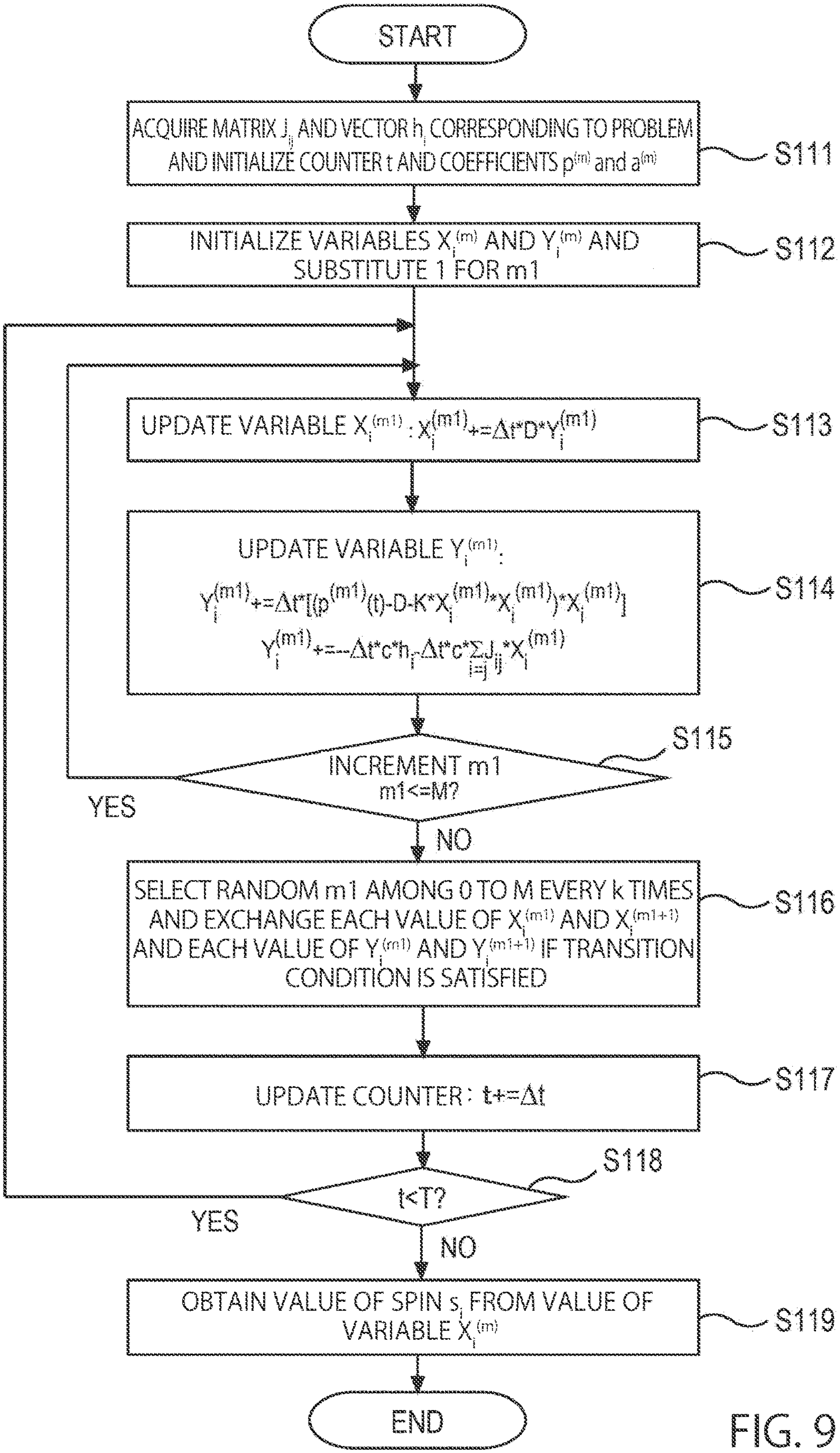
FIG. 9 is a flowchart illustrating an example of processing in a case where calculation of a simulated bifurcation algorithm is performed using the replica exchange method.

A flowchart of FIG. 9 illustrates an example of processing in the case where the calculation of the simulated bifurcation algorithm is performed using the replica exchange method. Hereinafter, the processing will be described with reference to FIG. 9.

First, the calculation server obtains the matrix $J_{ij}$ and the vector $h_i$ corresponding to the problem, and initializes a counter t and coefficients $p^{(m)}$ and $a^{(m)}$ (step S111). For example, in step S111, the values of the coefficients $p^{(m)}$ can be set so as to form a geometric progression. The counter t is set to 0, for example. Then, the calculation server initializes the element $X^{(m)}_i$ of the first vector and the element $Y^{(m)}_i$ of the second vector, and substitutes 1 for $m_1$ (step S112). Here, $m_1$ is a parameter used to designate the replica m. For example, in step S112, the initial values of the element $X^{(m)}_i$ of the first vector and the element $Y^{(m)}_i$ of the second vector can be set using pseudo random numbers. Next, the calculation server updates an element $X^{(m1)}_i$ of the first vector based on the element $Y^{(m)}_i$ of the corresponding second vector (step S113). For example, in step S113, $\Delta t \times D \times Y^{(m1)}_i$ can be added to the element $X^{(m1)}_i$ of the first vector. Then, the calculation server updates an element $Y^{(m1)}_i$ of the second vector (step S114). For example, in step S114, $\Delta t \times [(p - D - K \times X^{(m1)}_i \times X^{(m1)}_i) \times X^{(m1)}_i]$ can be added to the element $Y^{(m1)}_i$ of the second vector. In step S114, $-\Delta t \times c \times h_i \times a - \Delta t \times c \times \times X^{(m1)}_i$ can be further added to the variable $Y^{(m1)}_i$.

Next, the calculation server increments m1 and determines whether $m1 \leq M$ is satisfied (step S115). When the determination in step S115 is positive (YES in step S115), the processes in steps S113 to S115 are executed again. When the determination in step S115 is negative (NO in step S115), the calculation server selects random m1 from among 0 to M every k times, and exchanges each value of $X^{(m1)}_i$ and $X^{(m1+1)}_i$ and each value of $Y^{(m1)}_i$ and $Y^{(m1+1)}_i$ if a transition condition is satisfied (step S116). For example, the calculation server can generate a pseudo random number r of 0 or more and less than 1, and compare a value of r with the value of the above formula (9). When the value of the above formula (9) is larger than the value of the pseudo random number r, it can be determined that the transition condition is satisfied. On the other hand, when the value of the pseudo random number r is equal to or larger than the value of the above formula (9), it can be determined that the transition condition is not satisfied. Then, the calculation server updates the counter t (step S117). For example, in step S117, Δt can be added to t.

Next, it is determined whether the counter t is smaller than T (step S118). If the determination in step S118 is positive (YES in step S118), the calculation server executes the processes in steps S113 to S117 again. If the determination in step S118 is negative (NO in step S118), the calculation server obtains the spin $s_i$, which is the element of the solution vector, based on the value of the element (variable) $X^{(m)}_i$ of the first vector (step S119). For example, in step S119, the variable $X^{(m)}_i$ which is a positive value may be converted into +1, and the variable $X^{(m)}_i$ which is a negative value may be converted into −1. Note that, instead, whether the number of executions of the process in step S116 has exceeded a threshold may be determined in step S118.

As the variable $X^{(m)}_i$ in step S119, a representative value of the variable $X^{(m1)}_i$ selected from any replica of 1 to M can be used. Here, the representative value may be the variable $X^{(m1)}_i$ selected from any replica of 1 to M, or may be an average value of the variables $X^{(m1)}_i$ selected from at least one replica of 1 to M.

In the above-described flowchart of FIG. 9, processes of updating the elements of the first vector and the elements of the second vector (i=1, 2, . . . N) may be executed in parallel in at least some of steps S112 to S114 and S116 (second-level parallelization). In addition, at least some of the processes related to the respective replicas may be parallelized (first-level parallelization). For example, the processes of steps S112 to S114 related to a replica different for each of the calculation server, the virtual machine, or the processor may be executed. In this case, the process in step S116 may be executed by a program operating on any calculation server, or may be executed by the control unit 13 of the management server 1 described above. In addition, the process in step S119 may be executed by another server such as the management server 1.

Here, the information processing method, the storage medium, and the program according to the present embodiment will be described.

The information processing method may use a plurality of first calculators and a second calculator. For example, each of the plurality of first calculators is configured to repeatedly update a first vector having a first variable as an element and a second vector having a second variable corresponding to the first variable as an element. For example, the second calculator is configured to execute data exchange between the first calculators. In this case, the information processing method may include: a step of updating, by each of the first calculators, the first variable based on the corresponding second variable; a step of weighting, by each of the first calculators, the first variable with a first coefficient and adding the weighted first variable to the corresponding second variable; a step of calculating, by each of the first calculators, a problem term using the plurality of first variables; a step of adding, by each of the first calculators, the problem term to the second variable; and a step of executing, by the second calculator, at least one of exchange of the first vector and the second vector or exchange of the first coefficients between the first calculators.

In addition, the information processing method may use a plurality of first processors and second processors. For example, each of the plurality of first processors is configured to repeatedly update a first vector having a first variable as an element and a second vector having a second variable corresponding to the first variable as an element. For example, the second processor is configured to execute data exchange between the first processors. In this case, the information processing method may include: a step of updating, by each of the first processors, the first variable based on the corresponding second variable; a step of weighting, by each of the first processors, the first variable with a first coefficient and adding the weighted first variable to the corresponding second variable; a step of calculating, by each of the first processors, a problem term using the plurality of first variables; a step of adding, by each of the first processors, the problem term to the second variable; and a step of executing, by the second processor, at least one of exchange of the first vector and the second vector or exchange of the first coefficients between the first processors. The program according to the present embodiment may include steps similar to those of the information processing method. Further, a non-transitory computer-readable storage medium according to the present embodiment may store the program.

[Case where Value of Coefficient p Varies]

Heretofore, the description has been made assuming the case where the values of the coefficients $p^{(m)}$ and $a^{(m)}$ in each replica are determined in the step (step S111 in FIG. 9) before loop processing, and the fixed values of the coefficients $p^{(m)}$ and $a^{(m)}$ are used in the subsequent steps including the loop processing. However, the values of the coefficients $p^{(m)}$ and $a^{(m)}$ are not necessarily fixed in the case where the calculation of the simulated bifurcation algorithm is performed using the replica exchange method.

For example, the information processing device may vary the value of the coefficient $p^{(m)}$ based on the following Formula (13). Formula (13) is an example of the coefficient $p^{(m)}$ that can vary depending on a replica exchange timing or an exchange determination timing.

[Formula 13]

$$p^{(m)}(t) = \frac{(p_0^{(m+1)} + p_0^{(m)})}{2} + \frac{(p_0^{(m+1)} - p_0^{(m)})}{2}\cos\left(\pi\left(\frac{t}{T_0} + m\right)\right) \quad (13)$$

In Formula (13), $p^{(m)}(t)$ indicates that the value of the coefficient $p^{(m)}$ depends on the parameter t.

Condition (a)

First, the value of $p^{(m)}$ in a case where the value of the parameter t is 0 or an even multiple of $T_0$ will be described.

In a case where the replica number m is an even number, a value of cos ( . . . ) of Formula (13) becomes +1, and $p^{(m)}=p_0^{(m+1)}$ is established. On the other hand, in a case where the replica number m is an odd number, the value of cos ( . . . ) of Formula (13) becomes −1, and $p^{(m)}=p_0^{(m)}$ is established.

Condition (b)

Next, the value of $p^{(m)}$ in a case where the value of the parameter t is an odd multiple of $T_0$ will be described.

In a case where the replica number m is an even number, the value of cos ( . . . ) of Formula (13) becomes −1, and $p^{(m)}=p_0^{(m)}$ is established. On the other hand, in a case where the replica number m is an odd number, the value of cos ( . . . ) of Formula (13) becomes +1, and $p^{(m)}=p_0^{(m+1)}$ is established.

Condition (c)

Finally, the value of $p^{(m)}$ in a case where none of the above-described conditions (a) and (b) is satisfied for the value of the parameter t will be described.

In this case, cos ( . . . ) in Formula (13) takes a value in a range of (−1, +1), and thus, $p^{(m)}$ takes a value in which each of $p_0^{(m+1)}$ and $p_0^{(m)}$ is weighted, such as $\alpha p_0^{(m+1)}+\beta p_0^{(m)}$. Due to the periodicity of cos ( . . . ), $p^{(m)}$ having different values are used between the replica having the even number m and the replica having the odd number m. In this manner, each of the arithmetic circuits may periodically change the value of the first coefficient depending on the number of updates of the first vector and the second vector.

As the coefficient $p^{(m)}$ defined by the above-described Formula (13) is used, the following Formula (14) is established at the timing when the determination on exchange between replicas is performed.

[Formula 14]

$$\frac{W(m_1, m_1 + 1)}{W(m_1 + 1, m_1)} = 1 \quad (14)$$

In a case where the relation of Formula (14) is established at the exchange determination timing between the replicas, the first vector and the second vector are exchanged for the replica $m_1$ and the replica $m_1+1$ at each exchange determination timing. Since it is unnecessary to perform the calculation illustrated in Formula (9) at each exchange determination timing, the consumption of calculation resources can be suppressed. In addition, the process of determining whether to perform exchange can be skipped at the exchange determination timing (step S116) in the flowchart of FIG. 9, the exchange determination timing of FIG. 9 is replaced with an exchange timing.

In the case of using the coefficient $p^{(m)}$ expressed in Formula (13), the user needs to determine the values of $p_0^{(m+1)}$ and $p_0^{(m)}$ in advance. However, it is unnecessary to determine the update pattern of the coefficient $p^{(m)}$ and the definition of the coefficient $a^{(m)}$ as in the case of performing the time evolution calculation, and thus, it is possible to reduce the labor and effort required for execution of the simulated bifurcation algorithm. In addition, it is possible to efficiently exchange the first vector and the second vector between replicas and to obtain the optimal solution of the problem or the approximate solution close thereto in a relatively short time by using the coefficient $p^{(m)}$ expressed in Formula (13).

Note that the definition of the coefficient $p^{(m)}$ expressed in Formula (13) is merely an example. Therefore, the use of the coefficient $p^{(m)}$ having a different definition is not hindered.

Figure 10:
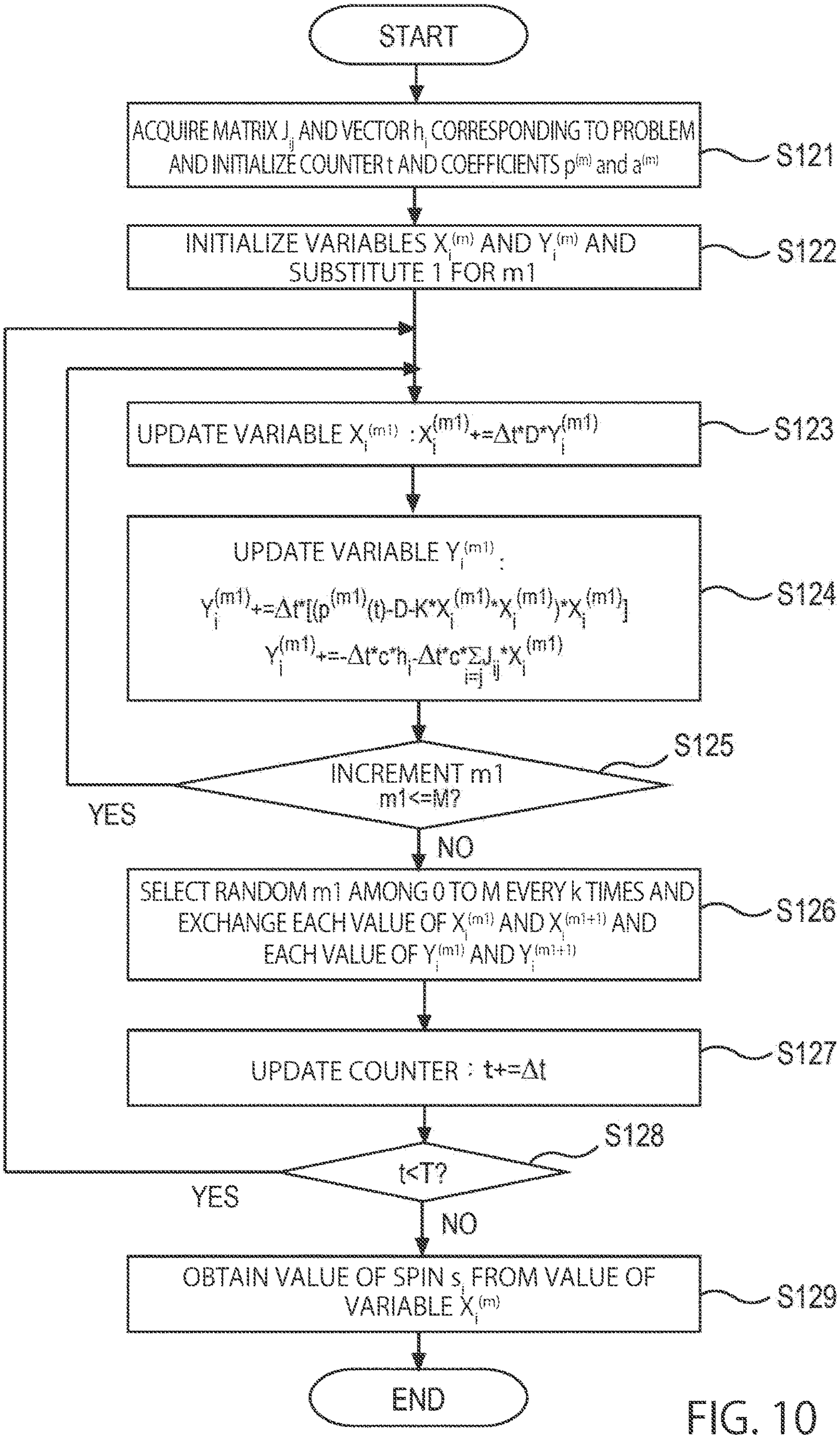
FIG. 10 is a flowchart illustrating an example of processing in a case where calculation is performed using a varying coefficient p(m).

A flowchart of FIG. 10 illustrates an example of processing in a case where calculation is performed using the varying coefficient $p^{(m)}$. Hereinafter, the processing will be described with reference to FIG. 10.

First, the calculation server obtains the matrix $J_{ij}$ and the vector $h_i$ corresponding to the problem, and initializes the counter t and the coefficients $p^{(m)}$ and $a^{(m)}$ (step S121). The counter t is set to 0, for example. In a case of following the definition of Formula (13), $p^{(m)}=p_0^{(m+1)}$ is set for the replica with the even number m. In addition, $p^{(m)}=p_0^{(m)}$ is set for the replica with the odd number m.

Processes in steps S122 to S125 correspond to the processes in steps S112 to S115 in FIG. 9, respectively, and thus, a detailed description thereof is omitted. If the determination in step S125 is positive (YES in step S125), the calculation server selects a random m1 from among 0 to M every k times, and exchanges each value of $X^{(m1)}_i$ and $X^{(m1+1)}_i$ and each value of $Y^{(m1)}_i$ and $Y^{(m1+1)}_i$ (step S126). In a case where the relation of Formula (14) is established, it is unnecessary to determine whether to perform exchange between replicas, and thus, step S126 corresponds to a timing for exchange of the first vector and the second vector between replicas. Then, the calculation server updates the counter t (step S127). For example, in step S127, Δt can be added to t.

Next, it is determined whether the counter t is smaller than T (step S128). If the determination in step S128 is positive (YES in step S128), the calculation server executes the processes in steps S123 to S127 again. If the determination in step S128 is negative (NO in step S128), the calculation server obtains the spin $s_i$, which is the element of the solution vector, based on the value of the element (variable) $X^{(m)}_i$ of the first vector (step S129). For example, in step S129, the variable $X^{(m)}_i$ which is a positive value may be converted into +1, and the variable $X^{(m)}_i$ which is a negative value may be converted into −1. A method for selecting and calculating a representative value that can be used as the variable $X^{(m)}_i$ in step S129 is not limited, which is similar to step S119 in FIG. 9. In addition, the process of step S129 may be executed by a server (calculator) other than the calculation server.

In the above-described flowchart of FIG. 10, processes of updating the elements of the first vector and the elements of the second vector (i=1, 2, . . . N) may be executed in parallel in at least some of steps S122 to S124 and S126 (second-level parallelization). In addition, at least some of the processes related to the respective replicas may be parallelized (first-level parallelization). For example, the processes of steps S122 to S124 related to a replica different for each of the calculation server, the virtual machine, or the processor may be executed. In this case, the process in step S126 may be executed by a program operating on any calculation server, or may be executed by the control unit 13 of the management server 1 described above.

As the information processing device executes the processing of the flowchart in FIG. 10 using the coefficient $p^{(m)}$ expressed in Formula (13), it is possible to increase the parallelism of processes while suppressing the amount of calculation and to obtain the optimal solution of the problem or the approximate solution close thereto in a relatively short time.

[Parallelization of Replica Exchange Processes]

In the calculation of the simulated bifurcation algorithm using the replica exchange method, the processes of the replicas $m_1$ and $m_1+1$ to be exchanged need to be synchronized at least at the replica exchange timing in order to perform the process of exchanging the first vector and the second vector between replicas. Therefore, the replica exchange processes may be a bottleneck in speeding up the simulated bifurcation algorithm by the replica exchange method depending on implementation. Therefore, it is possible to take a measure for executing the replica exchange processes in parallel and easily synchronizing the processes between the replicas to be exchanged.

For example, it is possible to alternately execute a process (first exchange process) of exchanging the first vector and the second vector between the even-numbered replica $m_1$ and the replica $m_1+1$ and a process (second exchange process) of exchanging the first vector and the second vector between the odd-numbered replica $m_1$ and the replica $m_1+1$. As a result, it is possible to parallelize the exchange processes of the first vector and the second vector between the replicas.

Figure 11:
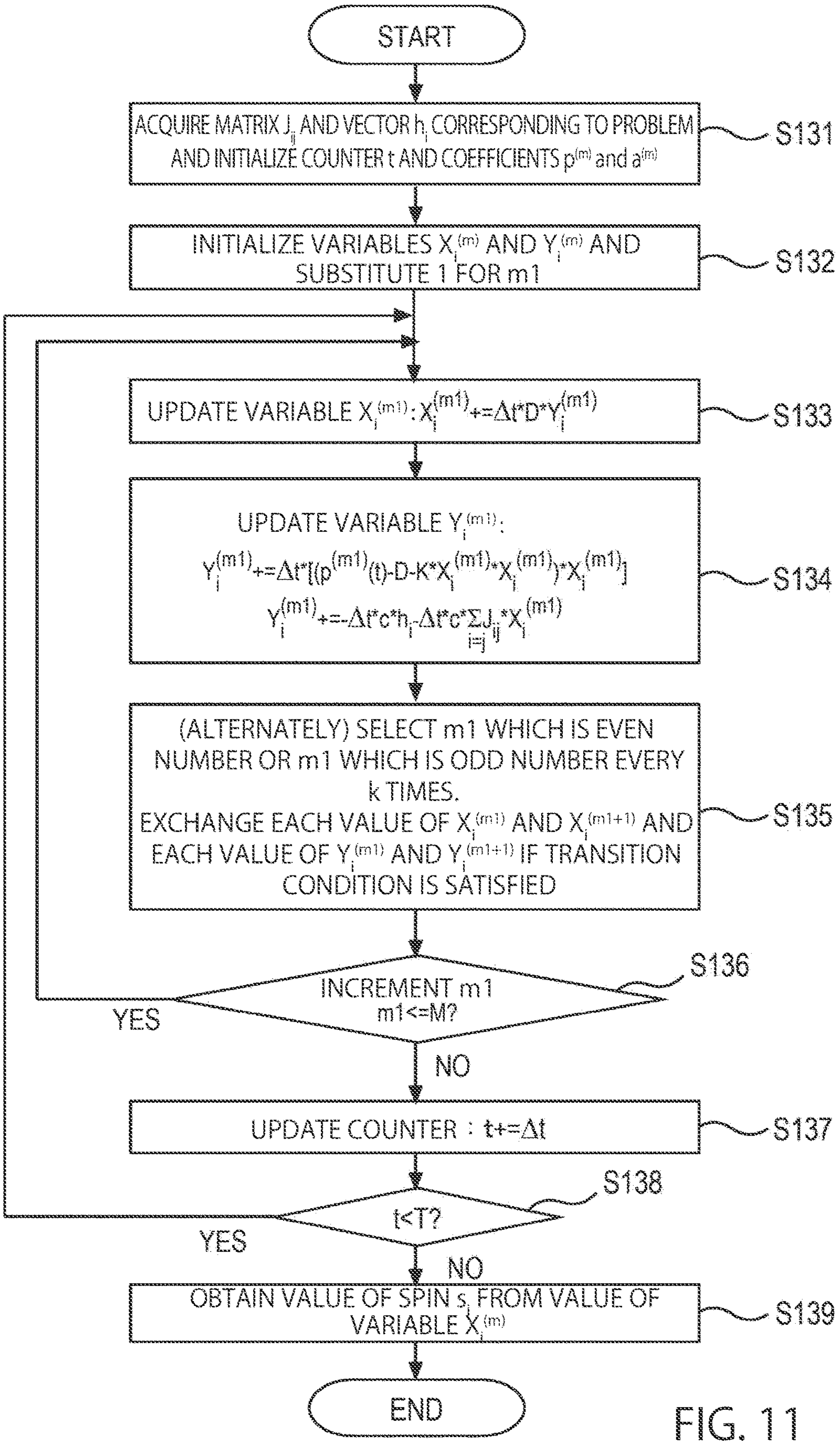
FIG. 11 is a flowchart illustrating an example of processing in a case where replica exchange is performed in parallel.

The flowchart of FIG. 11 illustrates an example of processing in the case where replica exchange is performed in parallel. Hereinafter, the processing will be described with reference to FIG. 11.

First, the calculation server obtains the matrix $J_{ij}$ and the vector $h_i$ corresponding to the problem, and initializes the counter t and the coefficients $p^{(m)}$ and $a^{(m)}$ (step S131). For example, a method for initializing the coefficient $p^{(m)}$ in step S131 may be similar to that in step S121 described above. In addition, a method for initializing the coefficient $p^{(m)}$ in step S131 may be similar to that in step S111 described above. In addition, in step S131, a combination of coefficients $p^{(m)}$ obtained on the experience side may be used. The counter t is set to 0, for example.

Then, the calculation server initializes the element $X^{(m)}{}_i$ of the first vector and the element $Y^{(m)}{}_i$ of the second vector, and substitutes 1 for $m_1$ (step S132). Here, $m_1$ is a parameter used to designate the replica m. For example, in step S132, the initial values of the element $X^{(m)}{}_i$ of the first vector and the element $Y^{(m)}{}_i$ of the second vector can be set using pseudo random numbers. Next, the calculation server updates an element $X^{(m1)}{}_i$ of the first vector based on the element $Y^{(m)}{}_i$ of the corresponding second vector (step S133). For example, in step S133, $\Delta t \times D \times Y^{(m1)}{}_i$ can be added to the element $X^{(m1)}{}_i$ of the first vector. Then, the calculation server updates an element $Y^{(m1)}{}_i$ of the second vector (step S134). For example, in step S134, $\Delta t \times [(p - D - K \times X^{(m1)}{}_i \times X^{(m1)}{}_i) \times X^{(m1)}{}_i]$ can be added to the element $Y^{(m1)}$, of the second vector. In step S134, $-\Delta t \times c \times h_i \times a - \Delta t \times c \times \times X^{(m1)}{}_i$ can be further added to the element $Y^{(m1)}{}_i$ of the second vector.

Next, the calculation server alternately selects $m_1$ which is an even number or $m_1$ which is an odd number every k times to determine the transition condition, and exchanges each value of $X^{(m1)}{}_i$ and $X^{(m1+1)}{}_i$ and each value of $Y^{(m1)}$, and $Y^{(m1+1)}{}_i$ if the transition condition is satisfied (step S135). For example, the calculation server can generate a pseudo random number r of 0 or more and less than 1, and compare a value of r with the value of the above formula (9). When the value of the above formula (9) is larger than the value of the pseudo random number r, it can be determined that the transition condition is satisfied. On the other hand, when the value of the pseudo random number r is equal to or larger than the value of the above formula (9), it can be determined that the transition condition is not satisfied.

Then, the calculation server increments m1 and determines whether m1 M is satisfied (step S136). When the determination in step S136 is positive (YES in step S136), the processes in steps S133 to S135 are executed again. When the determination in step S136 is negative (NO in step S136), the calculation server updates the counter t (step S137). For example, in step S137, Δt can be added to t.

Next, it is determined whether the counter t is smaller than T (step S138). If the determination in step S138 is positive (YES in step S138), the calculation server executes the processes in steps S133 to S137 again. If the determination in step S138 is negative (NO in step S138), the calculation server obtains the spin $s_i$, which is the element of the solution vector, based on the value of the element (variable) $X^{(m)}{}_i$ of the first vector (step S139). For example, in step S139, the variable $X^{(m)}{}_i$ which is a positive value may be converted into +1, and the variable $X^{(m)}{}_i$ which is a negative value may be converted into −1. A method for selecting and calculating a representative value that can be used as the variable $X^{(m)}{}_i$ in step S139 is not limited, which is similar to step S119 in FIG. 9. In addition, the process in step S139 may be executed by a server (information processing device) other than the calculation server.

In the above-described flowchart of FIG. 11, processes of updating the elements of the first vector and the elements of the second vector (i=1, 2, . . . N) may be executed in parallel in at least some of steps S132 to S135 (second-level parallelization). In addition, at least some of the processes related to the respective replicas may be parallelized (first-level parallelization). For example, the processes of steps S132 to S135 related to a replica different for each of the calculation server, the virtual machine, or the processor may be executed. In this case, the process in step S135 may be executed by a program operating on any calculation server, or may be executed by the control unit 13 of the management server 1 described above.

Figure 12:
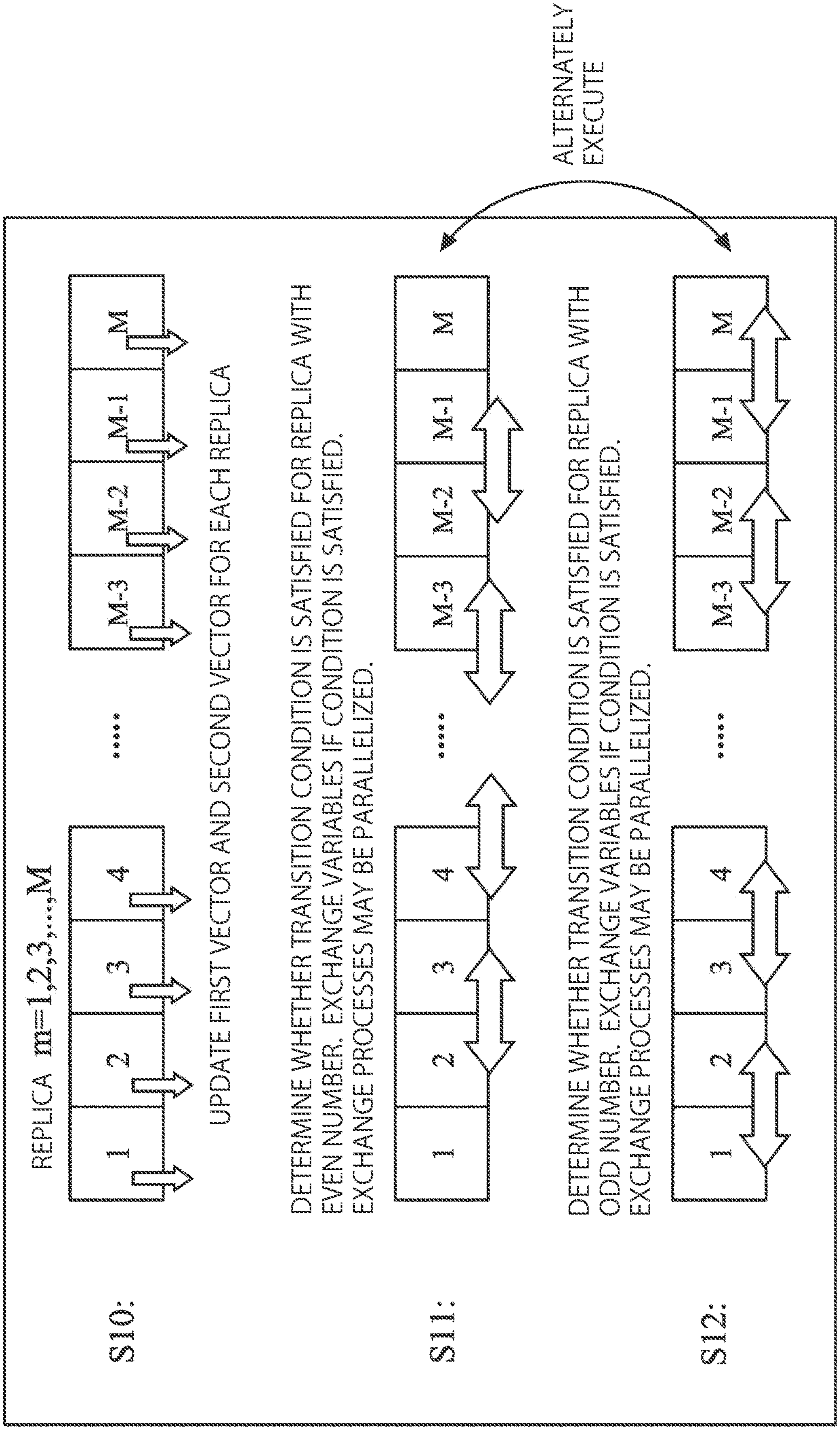
FIG. 12 is a diagram conceptually illustrating a processing flow in the replica exchange method.

FIG. 12 conceptually illustrates a processing flow in the replica exchange method. In FIG. 12, each square corresponds to a replica with a number of 1 to M.

Step S10 in FIG. 12 illustrates a case where the process of updating the first vector and the second vector is executed for each replica. Then, in step S11, it is determined whether a replica with an even number satisfies the transition condition, and the first vector and the second vector are exchanged when the transition condition is satisfied. In addition, in step S12, it is determined whether a replica with an even number satisfies the transition condition, and the first vector and the second vector are exchanged when the transition condition is satisfied. As described above, the transition condition can be determined by generating the pseudo random number r of 0 or more and less than 1 and comparing the value of r with the value of the above formula (9).

The data exchange circuit may be configured to select a pair of arithmetic circuits that differs depending on a timing, and perform at least one of exchange of the first vector and the second vector or exchange of the first coefficients. In addition, the data exchange circuit may be configured to alternately select a pair of a first combination and a pair of a second combination in the plurality of arithmetic circuits and execute at least one of exchange of the first vector and the second vector or exchange of the first coefficients. For example, it is assumed that there are replicas with numbers of 1 to 6. It is assumed that each of the replicas with the numbers of 1 to 6 is allocated to any of the arithmetic circuits. In this case, the first combination may include a pair of replicas with the numbers of 1 and 2, a pair of replicas with the numbers of 3 and 4, and a pair of replicas with the numbers of 5 and 6. On the other hand, the second combination may include a pair of replicas with the numbers of 2 and 3, a pair of replicas with the numbers of 4 and 5, and a pair of replicas with the numbers of 6 and 1.

As illustrated in FIG. 12, the process in step S11 and the process in step S12 can be alternately performed depending on the timing. As a result, the replica exchange processes are executed in parallel, and the optimal solution of the problem or the approximate solution close thereto can be obtained in a still shorter time.

FIG. 13 illustrates an example of a formula related to the replica exchange method. Formula (E1) in FIG. 13 illustrates an example of a Hamiltonian used in each replica. Formula (E2) illustrates an example of a canonical ensemble. Formula (E3) illustrates a general detailed balance equation. Formula (E4) illustrates a detailed balance equation in the canonical ensemble. Formula (E5) is obtained by rearranging terms of the detailed balance equation in the canonical ensemble. Formula (E6) represents a transition probability between the replica $m_1$ and a replica $m_2$.

Figure 14:
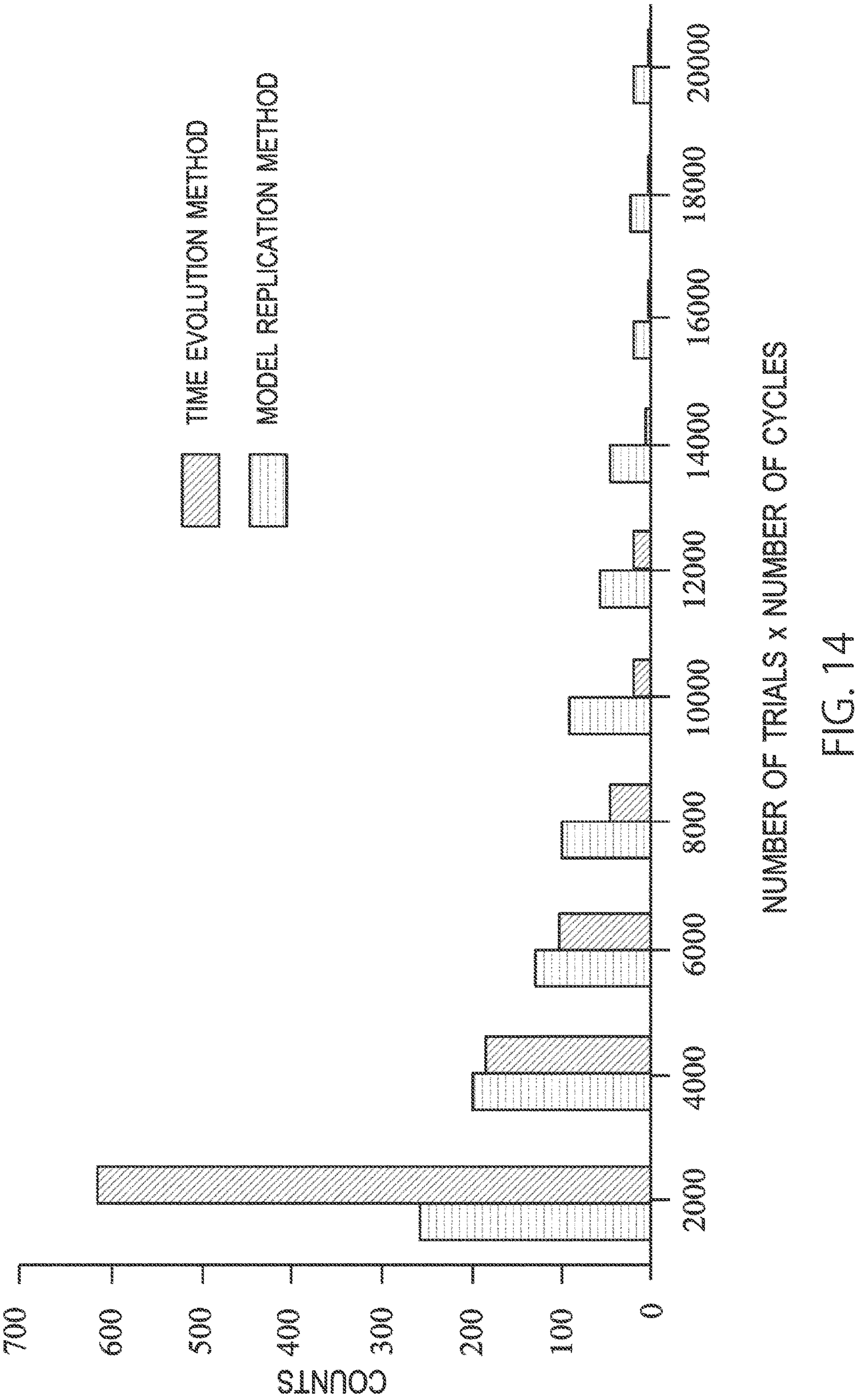
FIG. 14 is a histogram illustrating an example of the number of trials required until an optimal solution is obtained.

A graph in FIG. 14 is a histogram illustrating an example of the number of trials required until the optimal solution is obtained in each of the case where calculation of the simulated bifurcation algorithm is performed using the replica exchange method and the case where the calculation of the simulated bifurcation algorithm is performed by the time evolution. FIG. 14 illustrates data in a case where a Hamilton path problem of 48 nodes and 96 edges has been solved using the simulated bifurcation algorithm. The vertical axis in FIG. 14 represents the number of times of obtaining the optimal solution. In the calculation using the replica exchange method, the calculation is performed using 10 replicas. Therefore, the number of trials in one calculation by the replica exchange method is counted as 10 times. Note that whether an optimal solution is obtained is determined every 200 cycles in the case of the calculation by the time evolution. On the other hand, whether an optimal solution is obtained is determined every 50 cycles in the case of the calculation by the replica exchange method. Referring to the result of FIG. 14, when the replica exchange method is used, the optimal solution is obtained with a smaller number of trials as compared with the case of calculating the time evolution.

As the calculation is performed using the replica exchange method, redundancy can be imparted to the information processing system. For example, even if a calculator executing calculation of the first vector and the second vector in any of the replicas abnormally stops, the calculation process in the information processing system can be continued as long as a calculator executing the calculation of the first vector and the second vector in another replica continues to operate. In this case, data of the replica used in the calculator that has abnormally stopped may be restored based on data in the other replica. Even when the processor executing the calculation of the first vector and the second vector in any of the replicas abnormally stops, the calculation can be continued in another processor.

[Calculation Including Term of Many-Body Interaction]

It is also possible to solve a combinatorial optimization problem having a third-order or higher-order objective function by using the simulated bifurcation algorithm. A problem of obtaining a combination of variables that minimizes the third-order or higher-order objective function, which has a binary variable as a variable, is called a higher-order binary optimization (HOBO) problem. In a case of handling the HOBO problem, the following Formula (15) can be used as an energy formula in an Ising model extended to the higher order.

[Formula 15]

$$E_{HOBO} = \sum_{i=1}^{N} J_i^{(1)} s_i + \frac{1}{2}\sum_{i=1}^{N}\sum_{j=1}^{N} J_{i,j}^{(2)} s_i s_j + \frac{1}{3!}\sum_{i=1}^{N}\sum_{j=1}^{N}\sum_{k=1}^{N} J_{i,j,k}^{(3)} s_i s_j s_k + \ldots \tag{15}$$

Here, $J^{(n)}$ is an n-rank tensor, and is obtained by generalizing the matrix J of the local magnetic field $h_i$ and a coupling coefficient of Formula (1). For example, a tensor $J^{(1)}$ corresponds to a vector of the local magnetic field $h_i$. In the n-rank tensors $J^{(n)}$, when a plurality of indices have the same value, values of elements are 0. Although terms up to a third-order term are illustrated in Formula (15), but a higher-order term can also be defined in the same manner as in Formula (15). Formula (15) corresponds to the energy of the Ising model including a many-body interaction.

Note that both QUBO and HOBO can be said to be a type of polynomial unconstrained binary optimization (PUBO). That is, a combinatorial optimization problem having a second-order objective function in PUBO is QUBO. In addition, it can be said that a combinatorial optimization problem having a third-order or higher-order objective function in PUBO is HOBO.

In a case where the HOBO problem is solved using the simulated bifurcation algorithm, the Hamiltonian H of Formula (5) described above may be replaced with the Hamiltonian H of the following Formula (16).

[Formula 16]

$$H = \sum_{i=1}^{N}\left[\frac{D}{2}(x_i^2 + y_i^2) - \left(\frac{p(t)}{2}\right)x_i^2 + \frac{K}{4}x_i^4 + c\left(J_i^{(1)} x_i \alpha(t) + \frac{1}{2}\sum_{j=1}^{N} J_{i.j}^{(2)} x_i x_j + \frac{1}{3!}\sum_{j=1}^{N}\sum_{k=1}^{N} J_{i,j,k}^{(3)} x_i x_j x_k + \ldots\right)\right] \tag{16}$$

$$H_{Ising} = \sum_{i=1}^{N}\left[J_i^{(1)} x_i \alpha(t) + \frac{1}{2}\sum_{j=t}^{N} J_{i,j}^{(2)} x_i x_j + \frac{1}{3!}\sum_{j=1}^{N}\sum_{k=1}^{N} J_{i,j,k}^{(3)} x_i x_j x_k + \ldots\right]$$

In addition, a problem term expressed by the following Formula (17) is derived from Formula (16).

[Formula 17]

$$z_i = \frac{\partial H_{Ising}}{\partial x_i} = J_i^{(1)}\alpha(t) + \sum_{j=1}^{N} J_{i,j}^{(2)} x_j + \sum_{j=1}^{N}\sum_{k=1}^{N} J_{i,j,k}^{(3)} x_j x_k + \ldots \tag{17}$$

The problem term $z_i$ of (17) takes a format in which the second expression of (16) is partially differentiated with respect to any variable $x_i$ (element of the first vector). The partially differentiated variable $x_i$ differs depending on an index i. Here, the index i of the variable $x_i$ corresponds to an index designating an element of the first vector and an element of the second vector.

In a case where calculation including the term of the many-body interaction is performed, the recurrence formula of (11) described above is replaced with the following recurrence formula of (18).

[Formula 18]

$$X_i^{(m1)}(t+\Delta t) = X_i^{(m1)}(t) + DY_i^{(m1)}(t)\Delta t \tag{18}$$

$$Y_i^{(m1)}(t+\Delta t) = Y_i^{(m1)}(t) + \left[\left\{-D + p^{(m1)}(t+\Delta t) - KX_i^{(m1)}(t+\Delta t)X_i^{(m1)}(t+\Delta t)\right\}X_i^{(m1)}(t+\Delta t)\right]\Delta t - c\Delta t\left(J_i^{(i)}\alpha(t+\Delta t) + \sum_{j=1}^{N} J_{i,j}^{(2)}X_j^{(m1)}(t+\Delta t) + \sum_{j=1}^{N}\sum_{k=1}^{N} J_{i,j,k}^{(3)}X_j^{(m1)}(t+\Delta t)X_k^{(m1)}(t+\Delta t) + \dots\right)$$

(18) corresponds to a further generalized recurrence formula of (11).

The problem terms described above are merely examples of a problem term that can be used by the information processing device according to the present embodiment. Therefore, a format of the problem term used in the calculation may be different from these.

[Modified Example of Algorithm]

Here, a modified example of the simulated bifurcation algorithm will be described. For example, various modifications may be made to the above-described simulated bifurcation algorithm for the purpose of reducing an error or reducing a calculation time.

For example, in order to reduce an error in calculation, additional processing may be executed at the time of updating the element of the first vector. For example, when an absolute value of an element $X^{(n)}_i$ of the first vector becomes larger than 1 by the update, a value of the element $X^{(n)}_i$ of the first vector is replaced with $\mathrm{sgn}(X^{(n)}_i)$. That is, when $X^{(n)}_i>1$ is satisfied by the update, the value of the variable $X^{(n)}_i$ is set to 1. In addition, when $X^{(n)}_i<-1$ is satisfied by the update, the value of the variable $X^{(n)}_i$ is set to −1. As a result, it is possible to approximate the spin $s_i$ with higher accuracy using the variable $X^{(n)}_i$. Since such processing is included, the algorithm is equivalent to a physical model of an N particles having a wall at positions of $x_i=\pm1$. More generally speaking, an arithmetic circuit may be configured to set the first variable, which has a value smaller than a first value, to the first value, and set the first variable, which has a value larger than a second value, to the second value.

Further, when $X^{(n)}_i>1$ is satisfied by the update, a variable $Y^{(n)}_i$ corresponding to the variable $X^{(n)}_i$ may be multiplied by the coefficient rf. For example, when the coefficient rf of $-1<r\leq0$ is used, the above wall becomes a wall of the reflection coefficient rf. In particular, when the coefficient rf of rf=0 is used, the algorithm is equivalent to a physical model having walls where completely inelastic collisions occur at $X^{(n)}_i=\pm1$. More generally speaking, the arithmetic circuit may be configured to update a second variable which corresponds to the first variable having the value smaller than the first value or a second variable which corresponds to the first variable larger than the second value, to a value obtained by multiplying the original second variable by a second coefficient. For example, the arithmetic circuit may be configured to update the second variable which corresponds to the first variable having the value smaller than −1 or the second variable which corresponds to the first variable having the value larger than 1, to the value obtained by multiplying the original second variable by the second coefficient. Here, the second coefficient corresponds to the above-described coefficient rf.

Note that the arithmetic circuit may set the value of the variable $Y^{(n)}_i$ corresponding to the variable $X^{(n)}_i$ to a pseudo random number when $X^{(n)}_i>1$ is satisfied by the update. For example, a random number in the range of [−0.1, 0.1] can be used. That is, the arithmetic circuit may be configured to set a value of the second variable which corresponds to a first variable having the value smaller than the first value or a value of the second variable which corresponds to the first variable having the value larger than the second value, to the pseudo random number.

If the update process is executed so as to suppress $|X^{(n)}_i|>1$ as described above, the value of $X^{(n)}_i$ does not diverge even if a non-linear term $K\times X^{(n1)}_i(t+\Delta t)\times X^{(n1)}_i(t+\Delta t)$ in (11) and (18) is removed. Therefore, it is possible to use an algorithm illustrated in (19) below.

[Formula 19]

$$X_i^{(m1)}(t+\Delta t) = X_i^{(m1)}(t) + DY_i^{(m1)}(t)\Delta t \tag{19}$$

$$Y_i^{(m1)}(t+\Delta t) = Y_i^{(m1)}(t) + \left[\left\{-D + p^{(m1)}(t+\Delta t)\right\}X_i^{(m1)}(t+\Delta t)\right]\Delta t - c\Delta t\left(J_i^{(i)}\alpha(t+\Delta t) + \sum_{j=1}^{N} J_{i,j}^{(2)}X_i^{(m1)}(t+\Delta t) + \sum_{j=1}^{N}\sum_{k=1}^{N} J_{i,j,k}^{(3)}X_j^{(m1)}(t+\Delta t)X_k^{(m1)}(t+\Delta t) + \dots\right)$$

In the algorithm of (19), a continuous variable X is used in the problem term instead of a discrete variable. Therefore, there is a possibility that an error from the discrete variable used in the original combinatorial optimization problem occurs. In order to reduce this error, a value sgn(X) obtained by converting the continuous variable X by a signum function can be used instead of the continuous variable X in the calculation of the problem term as in (20) below.

[Formula 20]

$$X_i^{(m1)}(t+\Delta t) = X_i^{(m1)}(t) + DY_i^{(m1)}(t)\Delta t \tag{20}$$

$$Y_i^{(m1)}(t+\Delta t) = Y_i^{(m1)}(t) + [\{-D + p^{(m1)}(t+\Delta t)\}X_i^{(m1)}(t+\Delta t)]\Delta t - c\Delta t\left(J_i^{(1)}\alpha(t+\Delta t) + \sum_{j=1}^{N} J_{i,j}^{(2)}\mathrm{sgn}(X_j^{(m1)}(t+\Delta t)) + \sum_{j=1}^{N}\sum_{k=1}^{N} J_{i,j,k}^{(3)}\mathrm{sgn}(X_j^{(m1)}(t+\Delta t))\mathrm{sgn}(X_k^{(m1)}(t+\Delta t)) + \dots\right)$$

In (20), sgn(X) corresponds to the spin s.

In (20), the coefficient a of a term including the first-rank tensor in the problem term may be a constant (for example, a=1). In an algorithm of (20), the product of spins appearing in the problem term always takes any value of −1 or 1, and thus, it is possible to prevent the occurrence of an error due to the product operation when the HOMO problem having the higher-order objective function is handled. As in the algorithm of (20) described above, data calculated by the calculation server may further include a spin vector ($s_i$, $s_2$, . . . , $s_N$) having the variable $s_i$ (i=1, 2, . . . , N) as an element. The spin vector can be obtained by converting each element of the first vector by a signum function

[Example of Parallelization of Variable Update Processes]

Hereinafter, an example of parallelization of variable update processes at the time of calculation of the simulated bifurcation algorithm will be described.

First, an example in which the simulated bifurcation algorithm is implemented in a PC cluster will be described. The PC cluster is a system that connects a plurality of computers and realizes calculation performance that is not obtainable by one computer. For example, the information processing system 100 illustrated in FIG. 1 includes a plurality of calculation servers and processors, and can be used as the PC cluster. For example, the parallel calculation can be executed even in a configuration in which memories are arranged to be distributed in a plurality of calculation servers as in the information processing system 100 by using a message passing interface (MPI) in the PC cluster. For example, the control program 14E of the management server 1, the calculation program 34B and the control program 34C of each of the calculation servers can be implemented using the MPI.

In a case where the number of processors used in the PC cluster is Q, it is possible to cause each of the processors to calculate L variables among the variables $x_i$ included in the first vector ($x_1$, $x_2$, . . . , $x_N$). Similarly, it is possible to cause each of the processors to calculate L variables among the variables $y_i$ included in the second vector ($y_1$, $y_2$, . . . , $y_N$). That is, processors #j (j=1, 2, . . . , Q) calculate variables $\{x_m|m=(j-1)L+1, (j-1)L+2, \ldots, jL\}$ and $\{y_m|m=(j-1)L+1, (j-1)L+2, \ldots, jL\}$. In addition, a tensor $J^{(n)}$ expressed in the following (21), necessary for the calculation of $\{y_m|m=(j-1)L+1, (j-1)L+2, \ldots, jL\}$ by the processors #j, is stored in a storage area (for example, a register, a cache, a memory, or the like) accessible by the processors #j.

[Formula 21]

$$\{J_m^{(1)}|m=(i-1)L+1, \ldots iL\} \quad (21)$$

$$\{J_{m,j}^{(2)}|m=(i-1)L+1, \ldots iL; j=1, \ldots N\}$$

$$\{J_{m,j,k}^{(3)}|m=(i-1)L+1, \ldots iL; j=1, \ldots N; k=1, \ldots N\}, \ldots$$

Here, the case where each of the processors calculates the constant number of variables of each of the first vector and the second vector has been described. However, the number of variables of the first vector and the second vector to be calculated may be different depending on the processor. For example, in a case where there is a performance difference depending on a processor implemented in a calculation server, the number of variables to be calculated can be determined depending on the performance of the processor.

Values of all the components of the first vector ($x_1$, $x_2$, . . . , $x_N$) are required in order to update the value of the variable $y_i$. The conversion into a binary variable can be performed, for example, by using the signum function sgn( ). Therefore, the values of all the components of the first vector ($x_1$, $x_2$, . . . , $x_N$) can be shared by the Q processors using the Allgather function. Although it is necessary to share the values between the processors regarding the first vector ($x_1$, $x_2$, . . . , $x_N$), but it is not essential to share values between the processors regarding the second vector ($y_1$, $y_2$, . . . , $y_N$) and the tensor JO). The sharing of data between the processors can be realized, for example, by using inter-processor communication or by storing data in a shared memory.

The processor #j calculates a value of the problem term $\{z_m|m=(j-1)L+1, (j-1)L+2, \ldots, jL\}$. Then, the processor #j updates the variable $\{y_m|m=(j-1)L+1, (j-1)L+2, \ldots, jL\}$ based on the calculated value of the problem term $\{\{z_m|m=(j-1)L+1, (j-1)L+2, \ldots, jL\}$.

As illustrated in the above-described respective formulas, the calculation of the vector ($z_1$, $z_2$, . . . , $z_N$) of the problem term requires the product-sum operation including the calculation of the product of the tensor J(n) and the vector ($x_1$, $x_2$, . . . , $x_N$). The product-sum operation is processing with the largest calculation amount in the above-described algorithm, and can be a bottleneck in improving the calculation speed. Therefore, the product-sum operation is distributed to Q=N/L processors and executed in parallel in the implementation of the PC cluster, so that the calculation time can be shortened.

Figure 15:
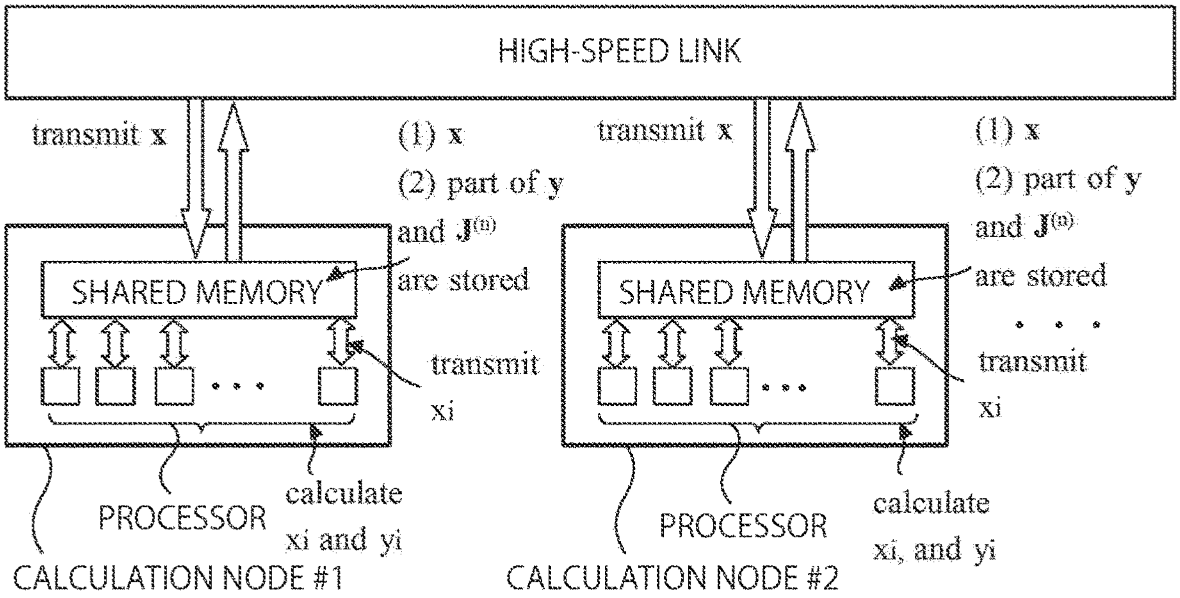
FIG. 15 is a diagram schematically illustrating an example of a multi-processor configuration.

FIG. 15 schematically illustrates an example of a multiprocessor configuration. A plurality of calculation nodes in FIG. 15 correspond to, for example, the plurality of calculation servers of the information processing system 100. In addition, a high-speed link of FIG. 15 corresponds to, for example, the interconnection between the calculation servers formed by the cables 4*a* to 4*c* and the switch 5 of the information processing system 100. A shared memory in FIG. 15 corresponds to, for example, the shared memory 32. Processors in FIG. 15 correspond to, for example, the processors 33A to 33D of the respective calculation servers. Note that FIG. 15 illustrates the plurality of calculation nodes, but the use of a configuration of a single calculation node is not precluded.

FIG. 15 illustrates data arranged in each of components and data transferred between the components. In each of the processors, values of the variables $x_i$ and $y_i$ are calculated. In addition, the variable $x_i$ is transferred between the processor and the shared memory. In the shared memory of each of the calculation nodes, for example, the first vector ($x_1$, $x_2$, . . . , $x_N$)), L variables of the second vector ($y_1$, $y_2$, . . . , $y_N$), and some of the tensors $J^{(n)}$ are stored. Then, for example, the first vector ($x_1$, $x_2$, . . . , $x_N$) is transferred in the high-speed link connecting the calculation nodes. In a case where the Allgather function is used, all elements of the first vector ($x_1$, $x_2$, . . . , $x_N$) are required in order to update the variable $y_i$ in each of the processors.

When the replica exchange method is used, one or more calculation nodes may be allocated for calculation of the first vector and the second vector in the respective replicas. In this case, at the execution timing in the replica exchange process, the data of the first vector and the second vector is transferred between the calculation nodes via the high-speed link. For example, the control unit 13 of the management server 1 can control the calculation node. Note that the arrangement and transfer of data illustrated in FIG. 15 are merely examples. A data arrangement method, a transfer method, and a parallelization method in the PC cluster are not particularly limited.

In addition, the simulated bifurcation algorithm may be calculated using a graphics processing unit (GPU).

Figure 16:
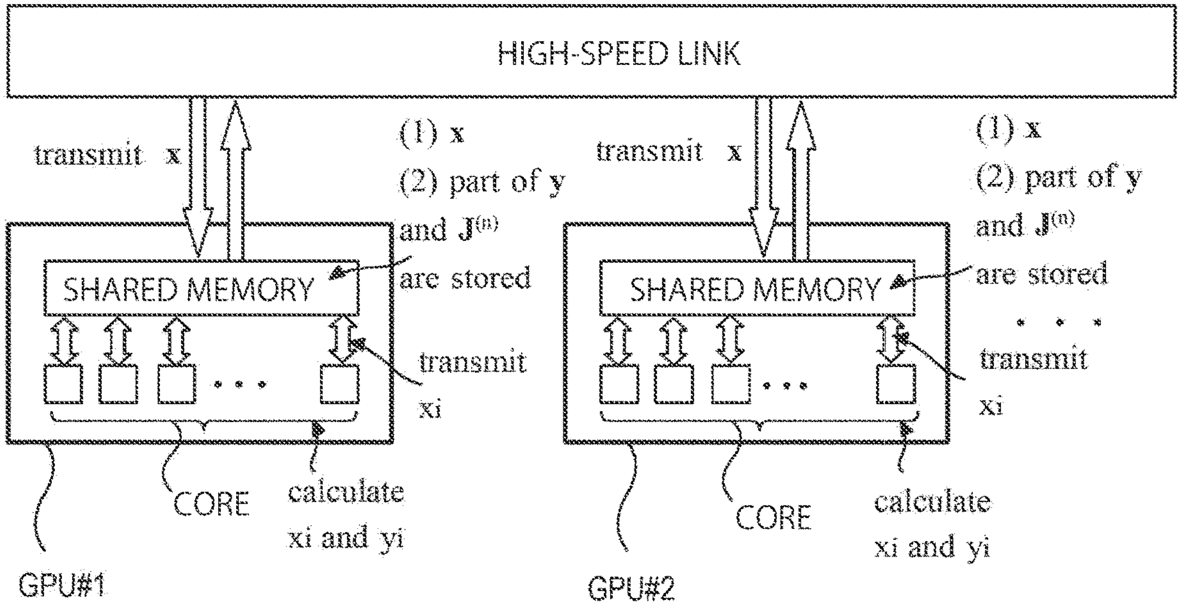
FIG. 16 is a diagram schematically illustrating an example of a configuration using a GPU.

FIG. 16 schematically illustrates an example of a configuration using the GPU. FIG. 16 illustrates a plurality of GPUs connected to each other by a high-speed link. Each GPU is equipped with a plurality of cores capable of accessing a shared memory. In addition, the plurality of GPUs are connected via the high-speed link to form a GPU cluster in the configuration example of FIG. 16. For example, if the GPUs are mounted on the respective calculation servers in FIG. 1, the high-speed link corresponds to the interconnection between the calculation servers formed by the cables 4*a* to 4*c* and the switch 5. Note that the plurality of GPUs are used in the configuration example of FIG. 16, but parallel calculation can be executed even in a case where one GPU is used. That is, each of the GPUs of FIG. 16 may perform the calculation corresponding to each of the calculation nodes of FIG. 15. That is, the processor of the information processing device (calculation server) may be a core of a graphics processing unit (GPU).

In the GPU, the variables $x_i$ and $y_i$ and the tensor $J^{(n)}$ are defined as device variables. The GPUs can calculate the product of the tensor $J^{(n)}$ necessary to update the variable $y_i$ and the first vector $(x_1, x_2, \ldots, x_N)$ in parallel by a matrix vector product function. Note that the product of the tensor and the vector can be obtained by repeatedly executing the matrix vector product operation. In addition, it is possible to parallelize the processes by causing each thread to execute a process of updating the i-th element $(x_i, y_i)$ for a portion other than the product-sum operation in the calculation of the first vector $(x_1, x_2, \ldots, x_N)$ and the second vector $(y_1, y_2, \ldots, y_N)$.

[Overall Processing for Solving Combinatorial Optimization Problem]

The following describes overall processing executed to solve a combinatorial optimization problem using the simulated bifurcation algorithm.

Figure 17:
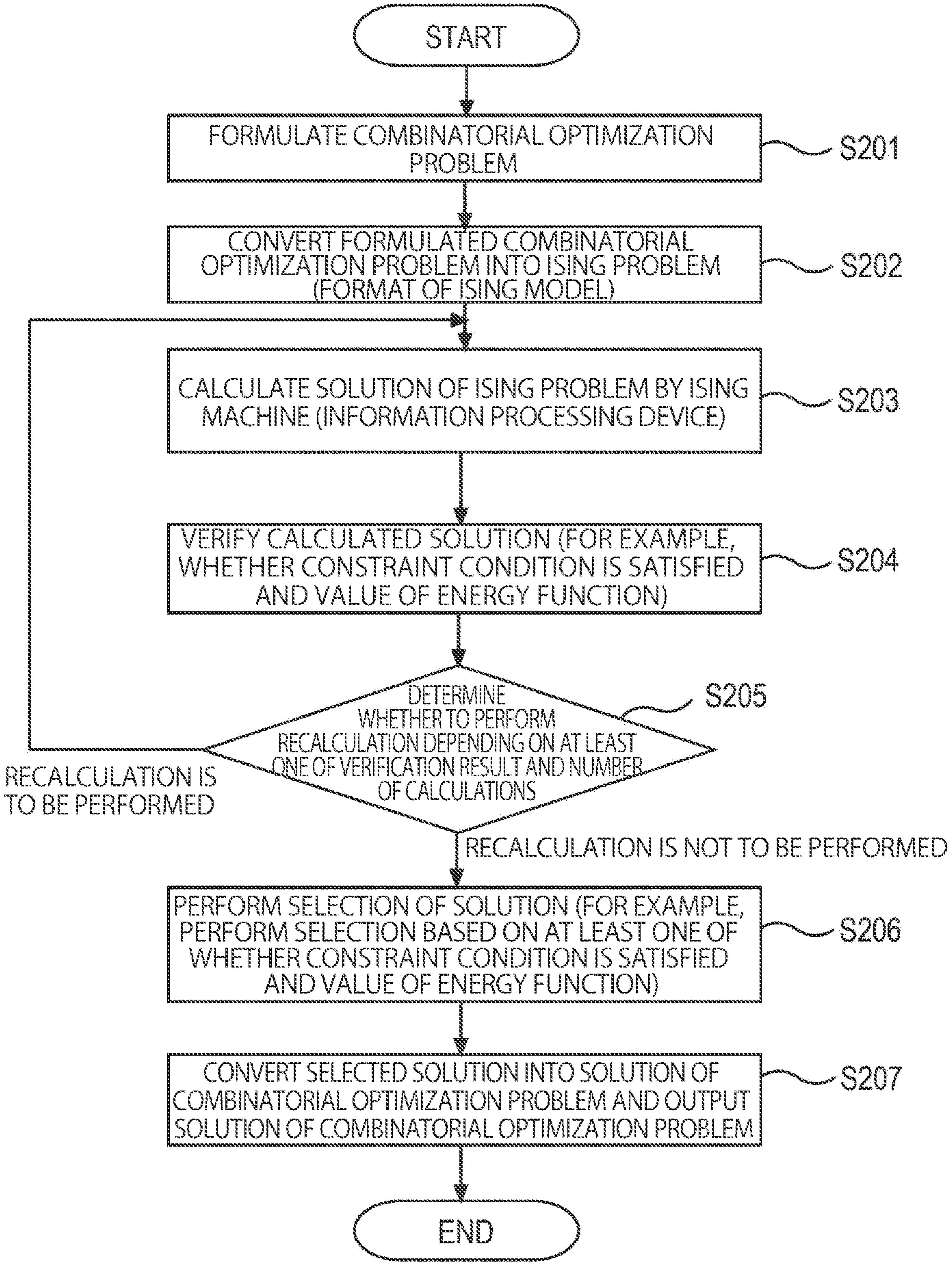
FIG. 17 is a flowchart illustrating an example of overall processing executed to solve a combinatorial optimization problem.

A flowchart of FIG. 17 illustrates an example of the overall processing executed to solve the combinatorial optimization problem. Hereinafter, processing will be described with reference to FIG. 17.

First, the combinatorial optimization problem is formulated (step S201). Then, the formulated combinatorial optimization problem is converted into an Ising problem (a format of an Ising model) (step S202). Next, a solution of the Ising problem is calculated by an Ising machine (information processing device) (step S203). Then, the calculated solution is verified (step S204). For example, in step S204, whether a constraint condition has been satisfied is confirmed. Further, in step S204, whether the obtained solution is the optimal solution or the approximate solution close thereto may be confirmed by referring to the value of the energy function (Hamiltonian).

Then, it is determined whether recalculation is to be performed depending on at least one of the verification result or the number of calculations in step S204 (step S205). When it is determined that the recalculation is to be performed (YES in step S205), the processes in steps S203 and S204 are executed again. On the other hand, when it is determined that the recalculation is not to be performed (NO in step S205), a solution is selected (step S206). For example, in step S206, selection can be performed based on at least one of whether the constraint condition is satisfied or the value of the energy function. Note that the process of step S206 may be skipped when a plurality of solutions are not calculated. Finally, the selected solution is converted into a solution of the combinatorial optimization problem, and the solution of the combinatorial optimization problem is output (step S207).

When the information processing device, the information processing system, the information processing method, the storage medium, and the program described above are used, the solution of the combinatorial optimization problem can be calculated within the practical time. As a result, it becomes easier to solve the combinatorial optimization problem, and it is possible to promote social innovation and progress in science and technology.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing device comprising:
- a host bus adapter;
- a shared memory configured to store a plurality of first variables which are elements of a first vector and a subset of second variables among a plurality of second variables which are corresponding elements of a second vector, wherein the number of first variables in the plurality of first variables is the same as the number of second variables in the plurality of second variables;
- a plurality of arithmetic circuits connected to the shared memory via a bus, each of the arithmetic circuits being configured to repeatedly update the first vector and the second vector; and
- a data exchange circuit connected to the shared memory via the bus, wherein
- each of the arithmetic circuits is configured to
  - retrieve the plurality of first variables and the subset of second variables from the shared memory via the bus,
  - update a subset of first variables from among the plurality of first variables based on the subset of second variables, wherein the subset of first variables corresponding to the subset of second variables,
  - weight the subset of first variables with one of a plurality of first coefficients respectively corresponding to the plurality of arithmetic circuits, and add the weighted subset of first variables to the corresponding subset of second variables,
  - calculate a problem term using the plurality of first variables, and
  - add the problem term to the subset of second variables,
- the first coefficients in the respective arithmetic circuits have different values,
- the data exchange circuit is configured to execute at least one of a first exchange of the first vector and the second vector or a second exchange of the first coefficients between the arithmetic circuits,
- the plurality of arithmetic circuits are configured to update at least a part of the first vector and at least a part of the second vector in parallel,
- the information processing device is configured to transfer the plurality of first variables after the update via the host bus adapter, and
- the plurality of arithmetic circuits are forming a cluster of processors in a computer cluster and configured to communicate using a message passing interface (MPI), the computer cluster being configured to realize calculation performance that is not attainable by one computer.

2. The information processing device according to claim 1, wherein the data exchange circuit is further configured to:

execute a condition determination for each pair of a plurality of pairs of the arithmetic circuits, determine that the condition is positive for a first pair of the arithmetic circuits of the plurality of pairs of the arithmetic circuit, and execute at least one of the first exchange of the first vector and the second vector used for calculation between the arithmetic circuits or the second exchange of the first coefficients used for calculation between the arithmetic circuits in the first pair of the arithmetic circuits.

3. The information processing device according to claim 2, wherein the data exchange circuit is further configured to execute the condition determination for the first pair of the arithmetic circuits based on the first vector, the second vector, and the first coefficient in the arithmetic circuits included in the first pair.

4. The information processing device according to claim 1, wherein the first coefficients used in the arithmetic circuits have a relation of a geometric progression.

5. The information processing device according to claim 1, wherein each of the arithmetic circuits periodically changes the value of the first coefficient depending on a number of updates of the first vector and the second vector.

6. The information processing device according to claim 1, wherein the data exchange circuit is further configured to select a pair of a plurality of pairs of the arithmetic circuits that differs depending on a timing, and execute at least one of the first exchange of the first vector and the second vector or the second exchange of the first coefficients between the arithmetic circuits in the selected pair.

7. The information processing device according to claim 1, wherein the data exchange circuit is further configured to alternately select a first pair of a first combination and a second pair of a second combination in a plurality of pairs of arithmetic circuits, and execute at least one of the first exchange of the first vector and the second vector or the second exchange of the first coefficients between the arithmetic circuits in the first pair and between the arithmetic circuits in the second pair.

8. The information processing device according to claim 1, wherein the problem term calculated by the arithmetic circuit is based on an Ising model.

9. The information processing device according to claim 8, wherein the problem term calculated by the arithmetic circuit includes many-body interaction.

10. The information processing device according to claim 1, wherein the number of second variables corresponding to each of the arithmetic circuits is determined based upon the performance of the corresponding arithmetic circuit.

11. An information processing system comprising:

a management server configured to convert a combinatorial optimization problem into a format that can be processed by a plurality of information processing devices, and transmit the converted problem to the plurality of information processing devices via a network; and the plurality of information processing devices forming a cluster of processors in a computer cluster and configured to communicate using a message passing interface (MPI), the computer cluster being configured to realize calculation performance that is not attainable by one computer, each of the information processing devices including:

a host bus adapter;

a shared memory configured to store a plurality of first variables which are elements of a first vector and a subset of second variables among a plurality of second variables which are corresponding elements of a second vector, wherein the number of first variables in the plurality of first variables is the same as the number of second variables in the plurality of second variables;

a plurality of first calculators connected to the shared memory via a bus, each of the first calculators being configured to repeatedly update the first vector and the second vector; and a second calculator connected to the shared memory via the bus and configured to execute data exchange between the first calculators, wherein each of the first calculators is configured to retrieve the plurality of first variables and the subset of second variables from the shared memory via the bus, update a subset of first variables from among the plurality of first variables based on the subset of second variables, wherein the subset of first variables corresponding to the subset of second variables, weight the subset of first variables with one of a plurality of first coefficients respectively corresponding to the plurality of first calculators, and add the weighted subset of first variables to the corresponding subset of second variables, calculate a problem term using the plurality of first variables, and add the problem term to the subset of second variables, the second calculator is configured to execute at least one of a first exchange of the first vector and the second vector or a second exchange of the first coefficients between the first calculators, the first coefficients in the respective first calculators have different values, the first calculators are configured to update at least a part of the first vector and at least a part of the second vector in parallel, the management server is further configured to acquire calculation results from the first calculators, aggregate the calculation results, and convert the aggregated calculation result into a solution of the combinatorial optimization problem, and each of the plurality of information processing devices is configured to transfer the plurality of first variables via the host bus adapter after the update.

12. The information processing system according to claim 11, wherein the second calculator is further configured to:

execute a condition determination for each pair of a plurality of pairs of the first calculators, determine that the condition is positive for a first pair of the first calculators of the plurality of pairs of the first calculators; and execute at least one of the first exchange of the first vector and the second vector used for calculation between the first calculators in the first pair of the first calculators or the second exchange of the first coefficients used for calculation between the first calculators in the first pair of the first calculators.

13. The information processing system according to claim 11, wherein the number of second variables corresponding to each of the first calculators is determined based upon the performance of the corresponding first calculator.

14. An information processing method using a plurality of information processing devices each including a plurality of first calculators, configured to repeatedly update a first vector having a plurality of first variables as its elements and a second vector having a plurality of second variables corresponding to the plurality of first variables as its elements, and a second calculator configured to execute data exchange between the first calculators, the information processing method comprising:

converting, by a management server, a combinatorial optimization problem into a format that can be processed by the first calculators, and transmitting the converted problem to the first calculators;

retrieving, by each of the first calculators, the plurality of first variables and a subset of second variables from among the plurality of second variables from a memory shared by the plurality of first calculators and the second calculator;

updating, by each of the first calculators, a subset of first variables from among the plurality of first variables based on the subset of second variables, wherein the subset of first variables corresponding to the subset of second variables;

weighting, by each of the first calculators, the subset of first variables with one of a plurality of first coefficients respectively corresponding to the plurality of first calculators, and adding the weighted subset of first variables to the corresponding subset of second variables;

calculating, by each of the first calculators, a problem term using the plurality of first variables;

adding, by each of the first calculators, the problem term to the subset of second variables;

executing, by the second calculator, at least one of a first exchange of the elements of the first vector and the second vector or a second exchange of the first coefficients between the first calculators; and acquiring, by the management server, calculation results from the first calculators, aggregating the calculation results, and converting the aggregated calculation result into a solution of the combinatorial optimization problem, wherein the first calculators are configured to update at least a part of the first vector and at least a part of the second vector in parallel, each of the plurality of information processing devices is configured to transfer the plurality of first variables after the update via a host bus adapter, and the plurality of information processing devices forming a cluster of processors in a computer cluster and configured to communicate using a message passing interface (MPI), the computer cluster being configured to realize calculation performance that is not attainable by one computer.

15. The information processing method according to claim 14, wherein the number of second variables corresponding to each of the first calculators is determined based upon the performance of the corresponding first calculator.

16. An information processing method using a plurality of information processing devices each including a plurality of first processors, configured to repeatedly update a first vector having a plurality of first variables as its elements and a second vector having a plurality of second variables corresponding to the plurality of first variables as its elements, and a second processor configured to execute data exchange between the first processors, the information processing method comprising:

retrieving, by each of the first processors, the plurality of first variables and a subset of second variables from among the plurality of second variables from a memory shared by the plurality of first processors and the second processor;

updating, by each of the first processors, a subset of first variables from among the plurality of first variables based on the subset of second variables, wherein the subset of first variables corresponding to the subset of second variables;

weighting, by each of the first processors, the subset of first variables with one of a plurality of first coefficients respectively corresponding to the plurality of first processors, and adding the weighted subset of first variables to the corresponding subset of second variables;

calculating, by each of the first processors, a problem term using the plurality of first variables;

adding, by each of the first processors, the problem term to the subset of second variables; and executing, by the second processor, at least one of a first exchange of the first vector and the second vector or a second exchange of the first coefficients between the first processors, wherein the first processors are configured to update at least a part of the first vector and at least a part of the second vector in parallel, each of the plurality of information processing devices is configured to transfer the N first variables after the update via a host bus adapter, and the plurality of information processing devices forming a cluster of processors in a computer cluster and configured to communicate using a message passing interface (MPI), the computer cluster being configured to realize calculation performance that is not attainable by one computer.

17. The information processing method according to claim 16, wherein the number of second variables corresponding to each of the first processors is determined based upon the performance of the corresponding first processor.

18. A non-transitory computer-readable storage medium storing a program for causing each of a plurality of first processors of each of a plurality of information processing devices to repeatedly update a first vector having a plurality of first variables as its elements and a second vector having a plurality of second variables corresponding to the plurality of first variables as its elements, and causing a second processor of each of the plurality of information processing devices to execute data exchange between the first processors, the program causing a computer to execute:

retrieving, by each of the plurality of first processors, the plurality of first variables and a subset of second variables from among the plurality of second variables from a shared memory;

updating, by each of the plurality of first processors, a subset of first variables from among the plurality of first variables based on the subset of second variables, wherein the subset of first variables corresponding to the subset of second variables;

weighting, by each of the first processors, the subset of first variables with one of a plurality of first coefficients respectively corresponding to the plurality of first processors, and adding the weighted subset of first variables to the corresponding subset of second variables;

calculating, by each of the first processors, a problem term using the plurality of first variables;

adding, by each of the first processors, the problem term to the subset of second variables; and executing, by the second processor, at least one of a first exchange of the first vector and the second vector or a second exchange of the first coefficients between the first processors, wherein the first processors are configured to update at least a part of the first vector and at least a part of the second vector in parallel, each one the plurality of information processing devices is configured to transfer the N first variables after the update via a host bus adapter, and the plurality of information processing devices forming a cluster of processors in a computer cluster and configured to communicate using a message passing interface (MPI), the computer cluster being configured to realize calculation performance that is not attainable by one computer.

19. The non-transitory computer-readable storage medium according to claim 18, wherein the number of second variables corresponding to each of the first processors is determined based upon the performance of the corresponding first processor.

* * * * *